US012419413B2

(12) United States Patent
Keane et al.

(10) Patent No.: US 12,419,413 B2
(45) Date of Patent: Sep. 23, 2025

(54) ACCESSIBILITY OF STORAGE CABINETS

(71) Applicant: E Z REACH KITCHENS LIMITED, Carrick-on-Suir (IE)

(72) Inventors: Michael Keane, Carrick-on-Suir (IE); Ernie Hietrich, Cork (IE); Martin O'Malley, Dublin (IE); Anthony Bland, Bedford (GB)

(73) Assignee: E Z REACH KITCHENS LIMITED, Carrick-on-Suir (IE)

( * ) Notice: Subject to any disclaimer, the term of this patent is extended or adjusted under 35 U.S.C. 154(b) by 178 days.

(21) Appl. No.: 18/030,600

(22) PCT Filed: Oct. 1, 2021

(86) PCT No.: PCT/EP2021/077123
§ 371 (c)(1),
(2) Date: Apr. 6, 2023

(87) PCT Pub. No.: WO2022/073876
PCT Pub. Date: Apr. 14, 2022

(65) Prior Publication Data

US 2023/0371686 A1 Nov. 23, 2023

(30) Foreign Application Priority Data

Oct. 9, 2020 (EP) .................................... 20201172

(51) Int. Cl.
*A47B 51/00* (2006.01)
*A47B 46/00* (2006.01)
(Continued)

(52) U.S. Cl.
CPC ............ *A47B 46/00* (2013.01); *A47B 46/005* (2013.01); *A47B 51/00* (2013.01); *E05F 15/63* (2015.01);
(Continued)

(58) Field of Classification Search
CPC ....... E05F 15/63; E05F 15/638; E05F 15/665; A47B 46/00; A47B 46/005; A47B 51/00; E05Y 2900/20
See application file for complete search history.

(56) References Cited

U.S. PATENT DOCUMENTS 2,499,791 A * 3/1950 Spencer ................ A47B 51/00 312/247
2,634,186 A * 4/1953 Zuss ......................... A47F 3/06 312/247
(Continued)

FOREIGN PATENT DOCUMENTS

DE 20315920 U1 2/2004
EP 0864720 A2 9/1998
(Continued)

OTHER PUBLICATIONS

International Search Report issued in PCT/EP2021/077123; mailed Jan. 26, 2022.

*Primary Examiner* — Kimberley S Wright
(74) *Attorney, Agent, or Firm* — Studebaker & Brackett PC

(57) ABSTRACT

A drive apparatus fits into a storage cabinet with a storage unit with shelves and is suited for mounting on a wall above a worktop. A push/pull mechanism pushes the storage unit outwardly from the housing, and a separate vertical drive mechanism then lowers the storage unit to a level beneath the housing, where it is accessible. Because the storage unit is initially pushed outwardly to a to extended position, when it is lowered it does not impact on items directly underneath the cabinet. Hence the cabinet may be fitted in a conventional arrangement. A door drive mechanism allows automated opening and closing of the doors, but if they are opened manually the drive mechanism remains disengaged. Upon automated door closure the door mechanism disen-
(Continued)

gages when nearly closed due to the mutual physical arrangement of the mechanism components, thereby allowing the door's own soft hinge to complete the door closure, thereby avoiding pinch points and allowing the next door opening to be either manual or automated.

22 Claims, 21 Drawing Sheets

(51) Int. Cl.

| | |
|---|---|
| ***E05F 15/63*** | (2015.01) |
| *E05F 15/635* | (2015.01) |
| *E05F 15/638* | (2015.01) |
| *E05F 15/665* | (2015.01) |

(52) U.S. Cl.
CPC ........... *E05F 15/635* (2015.01); *E05F 15/638* (2015.01); *E05F 15/665* (2015.01); *E05Y 2900/20* (2013.01)

(56) References Cited

U.S. PATENT DOCUMENTS

| | | | | |
|---|---|---|---|---|
| 3,902,773 | A * | 9/1975 | Gondek ............... | A47B 63/067 198/597 |
| 8,157,108 | B1 | 4/2012 | Waldrop | |
| 8,424,983 | B1 | 4/2013 | Strauss et al. | |
| 9,284,766 | B2 | 3/2016 | Wenzel | |
| 9,872,561 | B1 * | 1/2018 | Alfaro .................. | A47B 88/457 |
| 11,039,685 | B2 * | 6/2021 | Qiu .......................... | B66D 1/30 |
| 2012/0313494 | A1 | 12/2012 | Chow | |
| 2013/0241384 | A1 * | 9/2013 | Strauss .................. | A47B 51/00 312/319.5 |
| 2016/0047160 | A1 | 2/2016 | Huynh | |
| 2018/0014637 | A1 * | 1/2018 | Villegas ............... | A47B 46/005 |
| 2022/0104615 | A1 * | 4/2022 | Sharma .................. | A47B 96/00 |
| 2022/0167740 | A1 * | 6/2022 | Sharma .................. | A47B 51/00 |

FOREIGN PATENT DOCUMENTS

| | | | |
|---|---|---|---|
| GB | 2398732 | A | 9/2004 |
| JP | 2005-137830 | A | 6/2005 |

* cited by examiner

ACCESSIBILITY OF STORAGE CABINETS

INTRODUCTION

The present invention relates to furniture such as storage cabinets or presses.

At present, many such cabinets are inaccessible to users with a wide range of disabilities especially but not limited to wheelchair users, or are at a low level which is not suited to able-bodied people.

JP2005137830 (Mitomi), DE20315920 (Brockmann), and US2012/0313494 (Chow) describe arrangements for control of cabinets.

The invention is directed towards providing an automated apparatus to achieve at least some of the following objectives.

Ability to retrofit to existing cabinets.

Minimisation of impact on existing furniture and surrounding areas such as kitchen worktops under a cabinet.

Improved versatility in how the presses and cabinets are used by both able-bodied people and people with disabilities.

SUMMARY

We describe a drive apparatus for a furniture unit, the apparatus comprising a controller with a user interface, a frame for securing to a wall, a push-pull drive mechanism to push the unit outwardly from a home position to a top extended position, and a vertical drive mechanism to then lower the unit to a level at which it is more accessible, and to subsequently lift the unit upwardly back to the top extended position, and in which the push-pull drive mechanism is adapted to then retract the unit (4) to the home position under control of the controller.

Preferably, the apparatus frame is configured to fit at least partially over a furniture unit, for example between a top wall of a storage unit and a housing of a cabinet within which the apparatus is fitted. Preferably, the push/pull drive mechanism comprises a chain for engaging a furniture unit and a sprocket to rotate to push the chain outwardly and pull the chain inwardly. Preferably, the chain movement is parallel to the push and pull direction. Preferably, the chain is housed in a curved pathway alongside which the sprocket is mounted.

Preferably, the push-pull mechanism is mounted in fixed relationship on the apparatus frame with the chain being operable to extend and retract relative to the frame to push a furniture unit out and pull it back. Preferably, the apparatus comprises a slidable frame for supporting a furniture unit, and said frame is slidably mounted to the apparatus frame for movement between the extended top and home positions. Preferably, the slidable frame is configured as a frame to overlie a furniture unit and to engage a rear of the unit.

Preferably, the vertical drive mechanism is mounted to said slidable frame, and is arranged to move a furniture unit vertically relative to the slidable frame (60). Preferably, the vertical drive mechanism comprises a lead screw drive having a lead screw for engaging a furniture unit.

Preferably, the apparatus further comprises a door drive mechanism to open and close a door.

Preferably, the door drive mechanism comprises a drive member and a driven member mutually positioned such that they are not engaged when the door is at or close to a closed position, and outward movement of the drive member causes full engagement with the driven member.

Preferably, the door drive mechanism drive member comprises a rotating drive arm and the driven member comprises a rotating driven arm, and said arms are mutually located and configured such that initial rotation of the drive arm brings it into engagement with the driven arm, and further rotation in the same direction causes full engagement and force on the driven arm for opening of a door connected to the driven member.

Preferably, the driven arm has a slot formed by an inner shorter member and an outer longer member, so that outward rotation of the drive arm brings it into engagement with the longer member in a door opening action. Preferably, the drive member and the driven member are mutually positioned and configured such that when a door-closed position approaches with a small angle α remaining to a fully closed position the drive member disengages from the driven member.

Preferably, the driven member has a slot formed by an inner shorter member and an outer longer member, so that outward rotation of the drive member brings it into engagement with the longer member in a door opening action; and wherein inward motion of the drive arm causes it to move out of said slot at a position where a door is nearly closed.

Preferably, the driven arm is linked by a pivot joint to a link arm which is in turn linked by a pivot joint to a bracket for fixing to a door. Preferably, the door arm comprises a roller/pin/spigot at or near an extremity of the drive arm, for engagement in the slot of the driven arm.

Preferably, the controller is configured to stop a current drive mechanism operation if an obstacle is detected or a contrary user instruction is received, and to reverse its movement. Preferably, the apparatus comprises sensors and the controller is configured to provide control instructions to the mechanisms according to both user instructions and sensor signals. Preferably, said sensors include one or more of optical, magnetic, inductive, capacitive, contact, and positional encoder sensors.

Preferably, the controller is configured to monitor load current of a motor or actuator of a drive mechanism and to reverse a deployment is over-current is detected. Preferably, the controller is configured to perform learning during operation to store expected load current or voltage values, and to recognize an abnormal event by comparison to said expected values.

Preferably, the apparatus further comprises at least one load sensor, and the controller is configured to determine a parameter value representing weight of a storage unit connected to the apparatus and to determine expected motor demand electrical parameter values accordingly.

Preferably, the apparatus comprises at least one proximity sensor, and the controller is configured to stop a movement if an obstacle is detected. Preferably, the apparatus comprises a temperature sensor, and the controller is configured to stop a movement if an abnormally high rise in temperature is detected near a lower end of a storage unit in use.

The invention also provides a furniture or storage unit comprising a drive apparatus of any example described herein.

The invention also provides a cabinet comprising a storage unit and a drive apparatus of any example arranged to move the storage unit to and from a home position within the cabinet.

The invention also provides a cabinet door drive mechanism to open and close a door of a storage unit, said mechanism comprising a drive member and a driven member for engaging a door, the drive and the driven members being mutually positioned and configured such that they are not engaged when a door is at or close to a closed position, and outward movement of the drive member causes full engagement with the driven member to open a door.

Preferably, the drive member comprises a rotating drive arm and the driven member comprises a rotating driven arm, and said arms are mutually located and configured such that initial rotation of the drive arm brings it into engagement with the driven arm, and further rotation in the same direction causes full engagement and force on the driven arm for opening of a door connected to the driven member. Preferably, the driven arm has a slot formed by an inner shorter member and an outer longer member, so that outward rotation of the drive arm brings it into engagement with the longer member in a door opening action.

Preferably, the drive arm and the driven arm are mutually positioned and configured such that when a door-closed position approaches with a small angle (a) remaining to a fully closed position the drive arm disengages from the driven arm.

Preferably, the driven arm has a slot formed by an inner shorter member and an outer longer member, so that outward rotation of the drive arm brings it into engagement with the longer member in a door opening action; and wherein inward motion of the drive arm causes it to move out of said slot.

Preferably, the driven arm is linked by a pivot joint to a link arm which is in turn linked by a pivot joint to a bracket for fixing to a door. Preferably, the door arm comprises a roller/pin/spigot at or near an extremity of the drive arm, for engagement in the slot of the driven arm.

ADDITIONAL STATEMENTS

We describe a storage cabinet having a housing and a storage unit, and further comprising a drive means to push the storage unit outwardly from the housing and to lower the storage unit to a level beneath the housing while it is in an extended position.

The cabinet may further comprise one or more doors, and a drive mechanism to open the door.

Preferably, the door drive mechanism comprises a drive member and a driven member mutually positioned such that they are not engaged when the door is at or close to a closed position, and further movement of the drive member causes full engagement.

Preferably, the door drive mechanism drive member comprises a rotating drive arm and the driven member comprises a rotating driven arm, and said arms are mutually located such that initial rotation of the drive arm brings it into engagement with the driven arm, and further rotation in the same direction causes full engagement and force on the driven arm to cause opening of the door.

Preferably, the driven arm has a slot wish a shorter side facing the drive arm, so that rotation of the drive arm brings it into engagement with a longer side of the slot.

Preferably, the door drive mechanism comprises a spring to urge final closure of the door when the drive and driven members are disengaged. Preferably, the door drive mechanism comprises a roller at or near an extremity of the drive arm, for engagement in a slot of the driven arm.

Preferably, the drive means comprises a drive mechanism adapted to push and retract the storage unit with respect to the housing, and a drive mechanism to lower and lift the unit when it is in an extended position. Preferably, said mechanisms are mounted between a top wall of the storage unit and the housing. Preferably, said mechanisms are hidden within the housing when the storage unit is retracted within the housing. Preferably, the drive mechanism for pushing the unit away from the housing comprises a chain fixed at an extremity to the storage unit and a sprocket to rotate to push the chain outwardly from the housing. Preferably, the chain and the sprocket are both co-planar with a direction of travel of the storage unit. In one example, the chain is housed in a curved pathway alongside which the sprocket is mounted. Preferably, the drive means for lifting and lowering the storage unit comprises a lead screw drive mounted between the housing and the storage unit.

The invention also provides drive means and mechanisms of any example described herein as a kit for installing in a cabinet by a third party.

DETAILED DESCRIPTION OF THE INVENTION

The invention will be more clearly understood from the following description of some embodiments thereof, given by way of example only with reference to the accompanying drawings in which.

Figure 7:
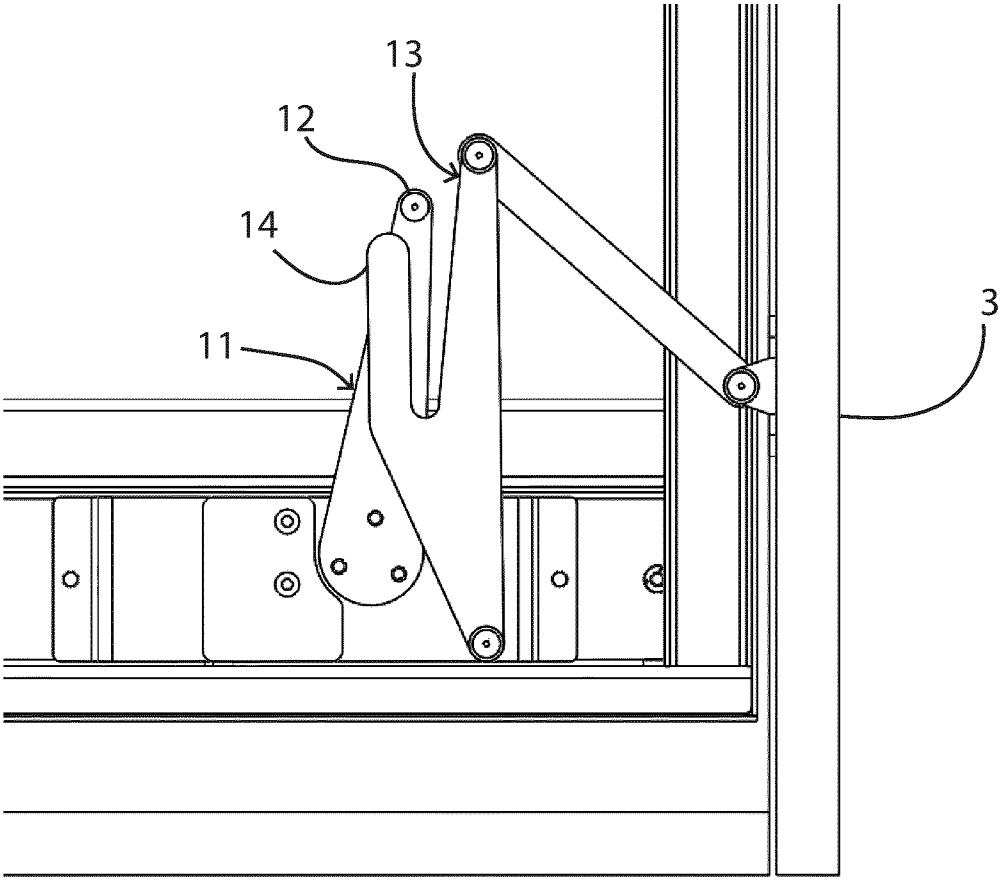
Figure 8D:
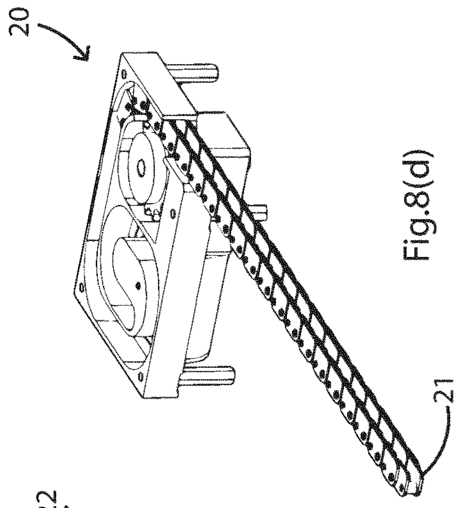
Figure 8C:
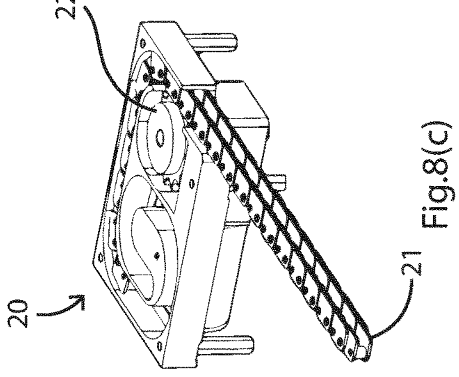
Figure 8B:
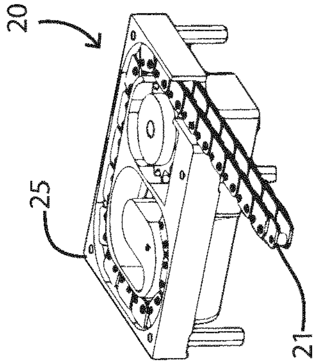
Figure 8A:
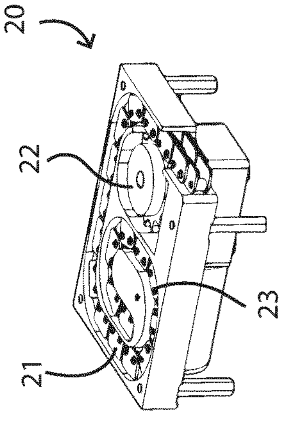
Figure 9B:
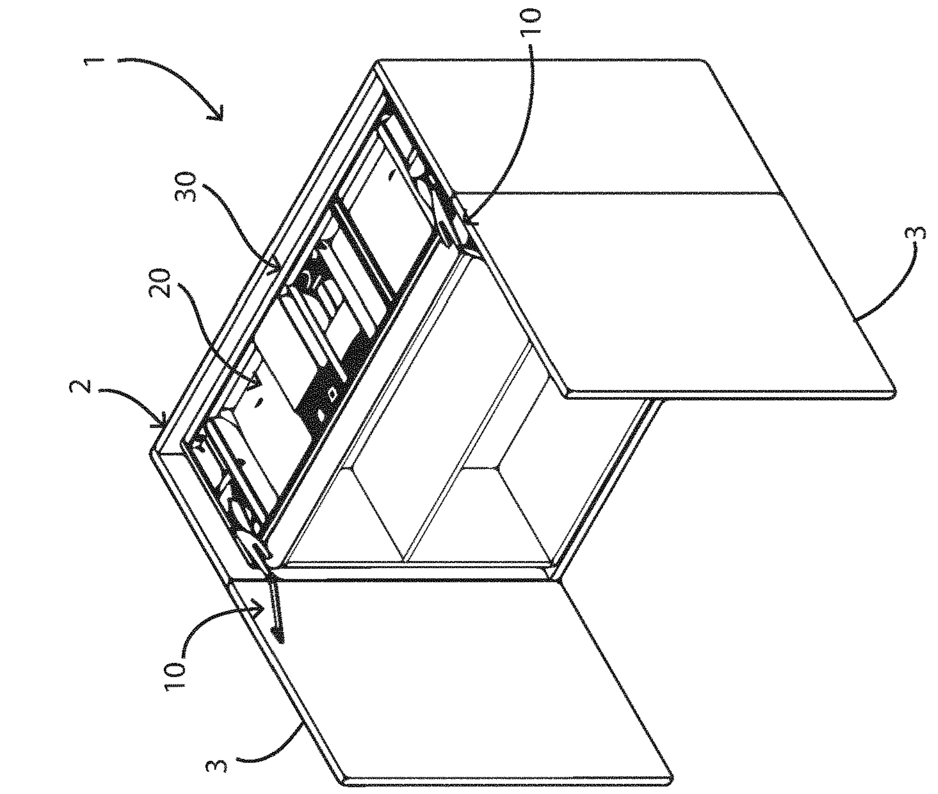
Figure 9A:
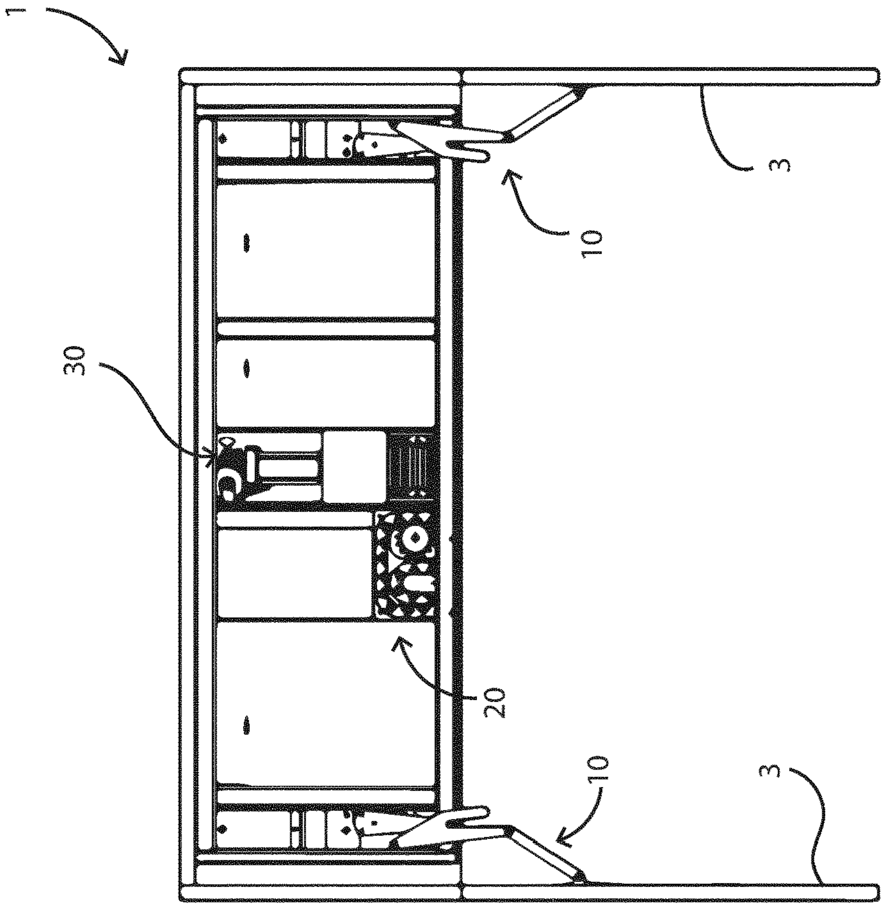
Figure 10B:
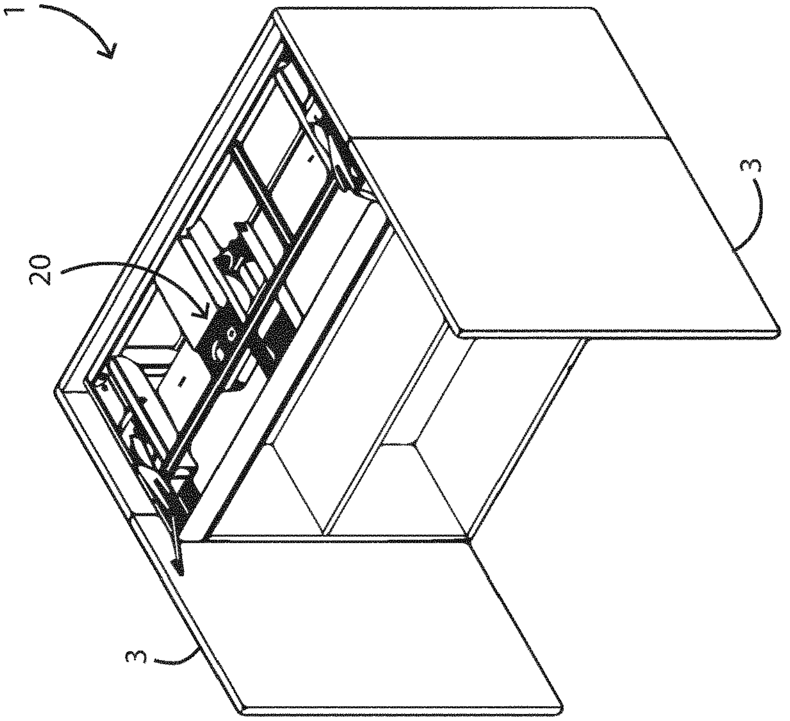
Figure 10A:
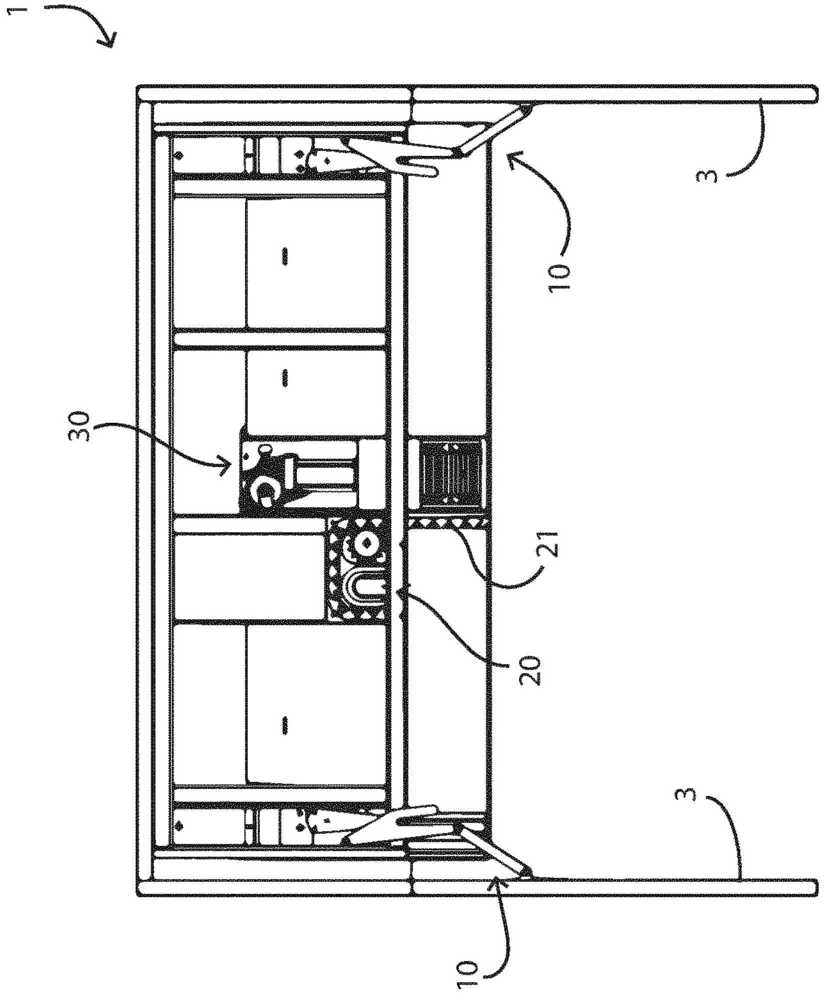
Figure 11B:
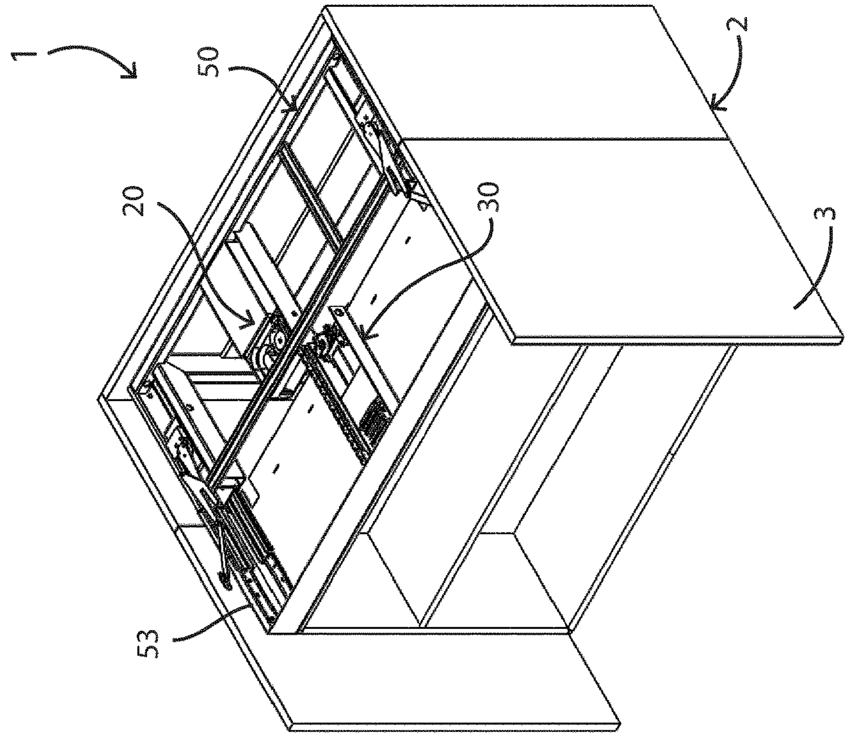
Figure 11A:
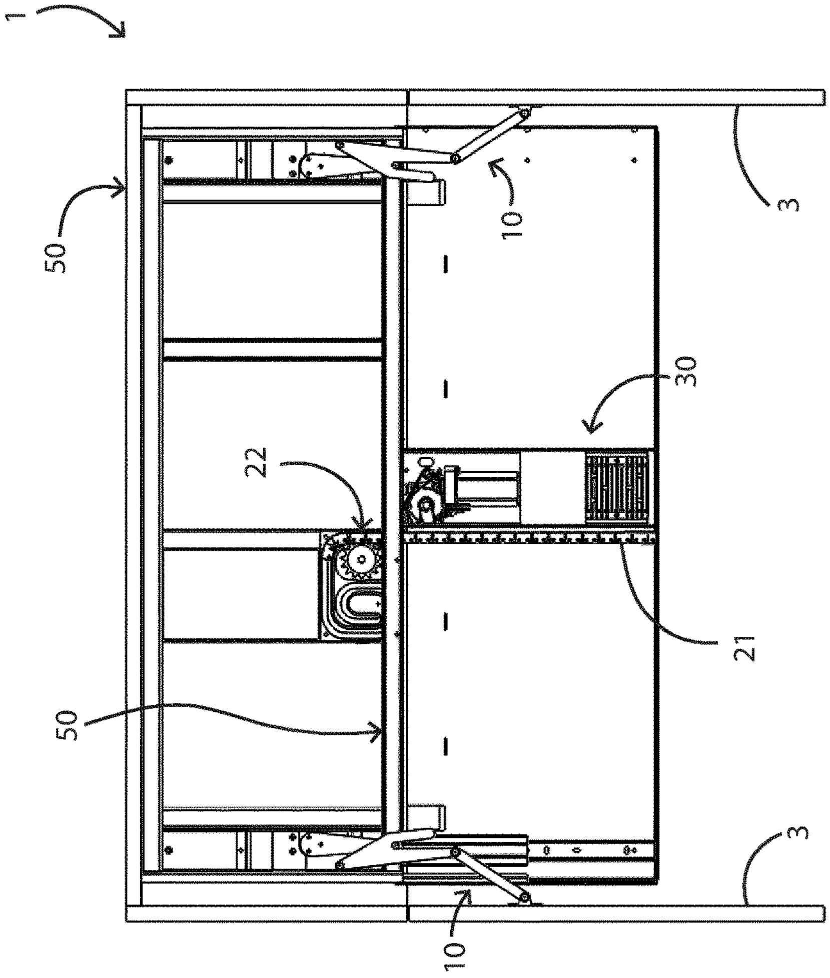
Figure 12D:
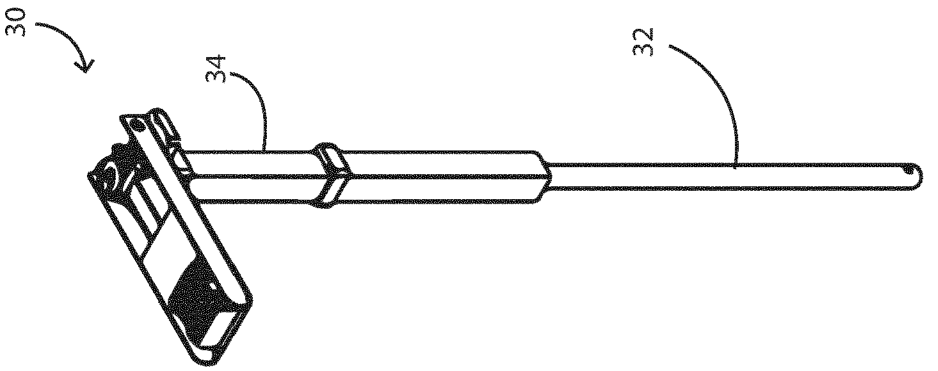
Figure 12C:
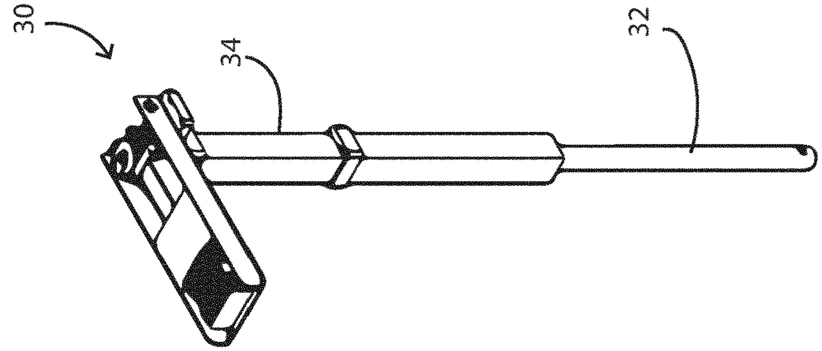
Figure 12B:
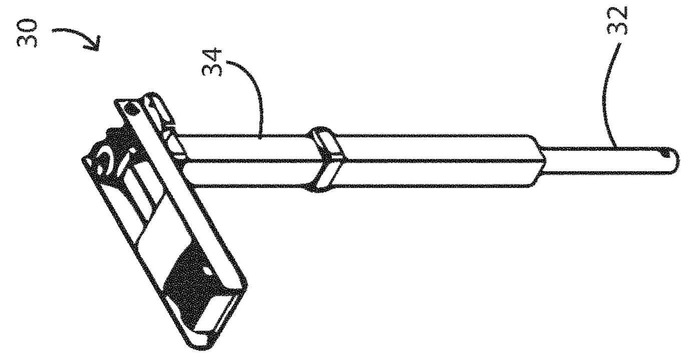
Figure 12A:
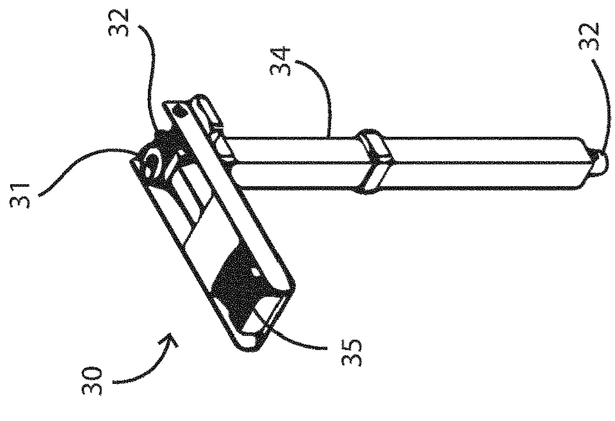
Figure 12E:
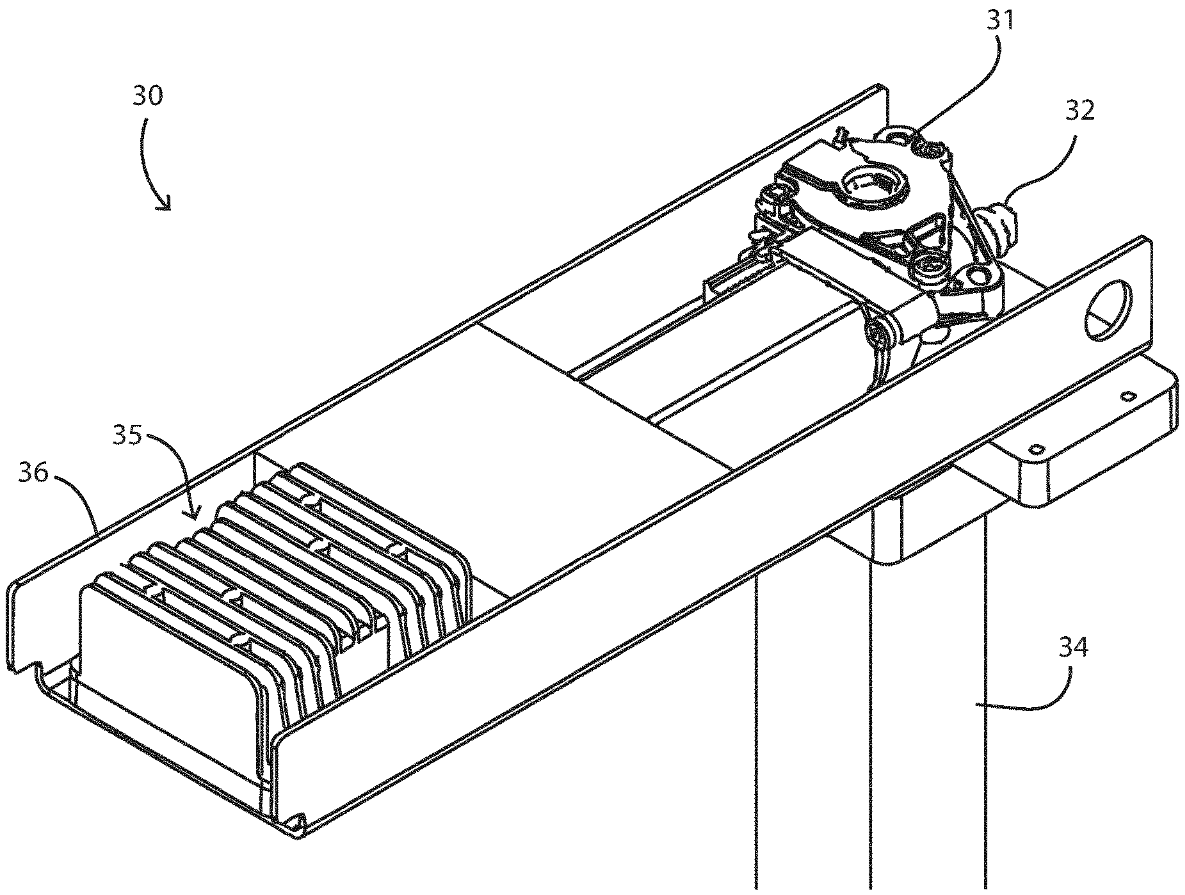
Figure 13A:
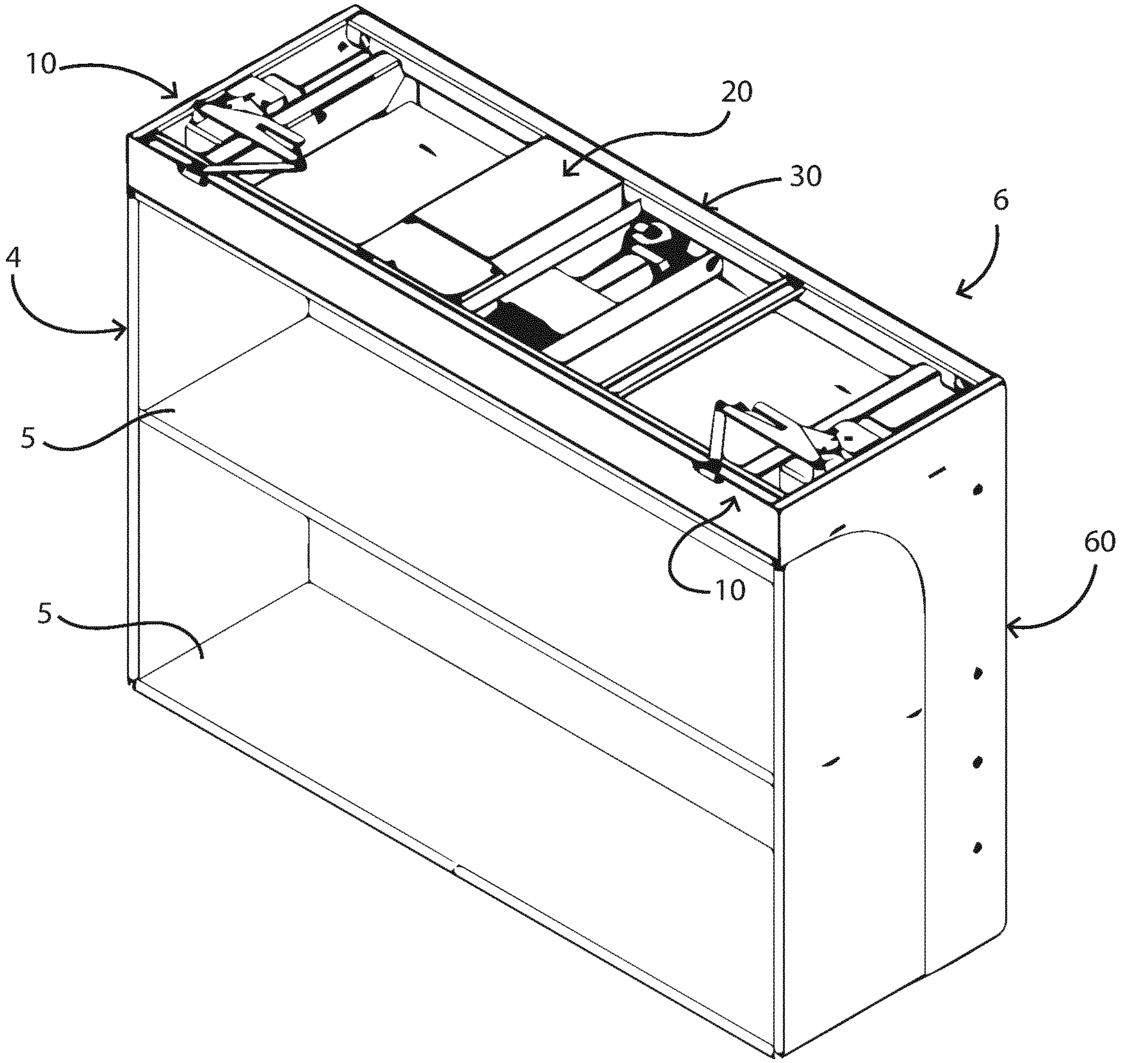
Figure 13B:
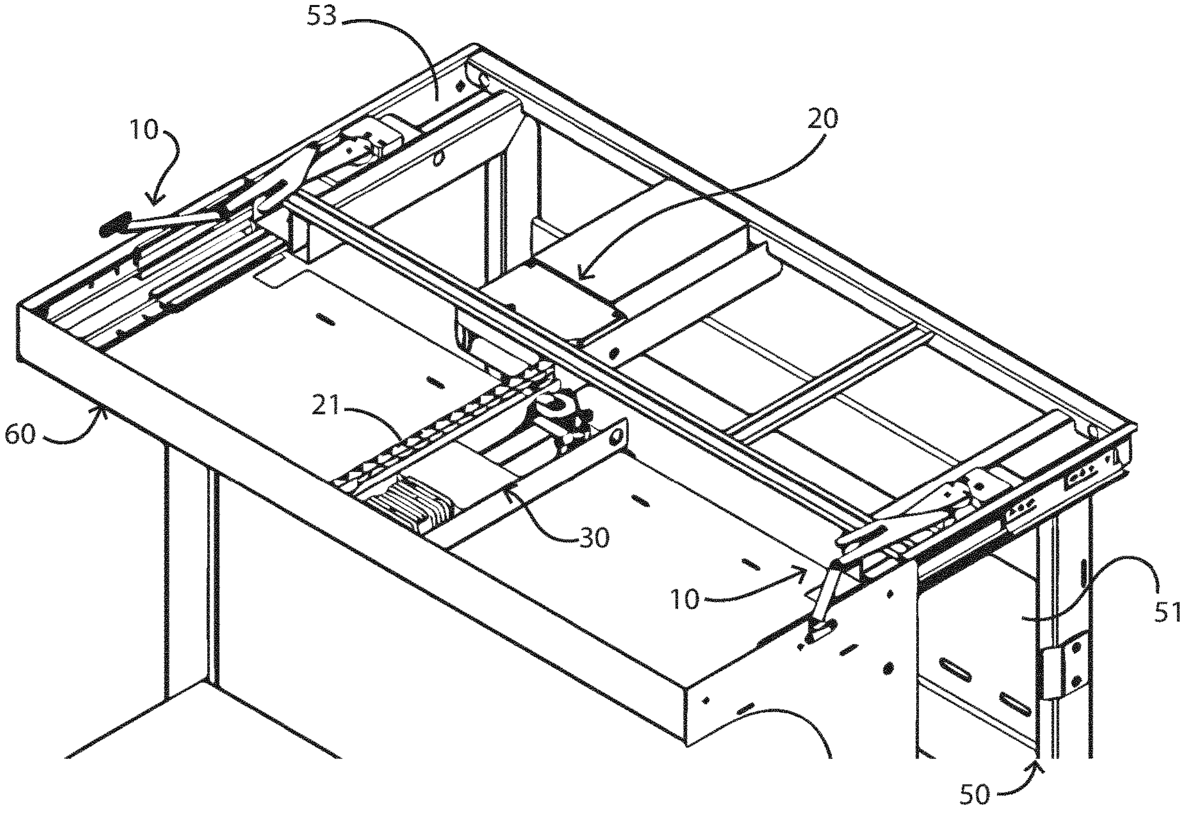
Figure 13C:
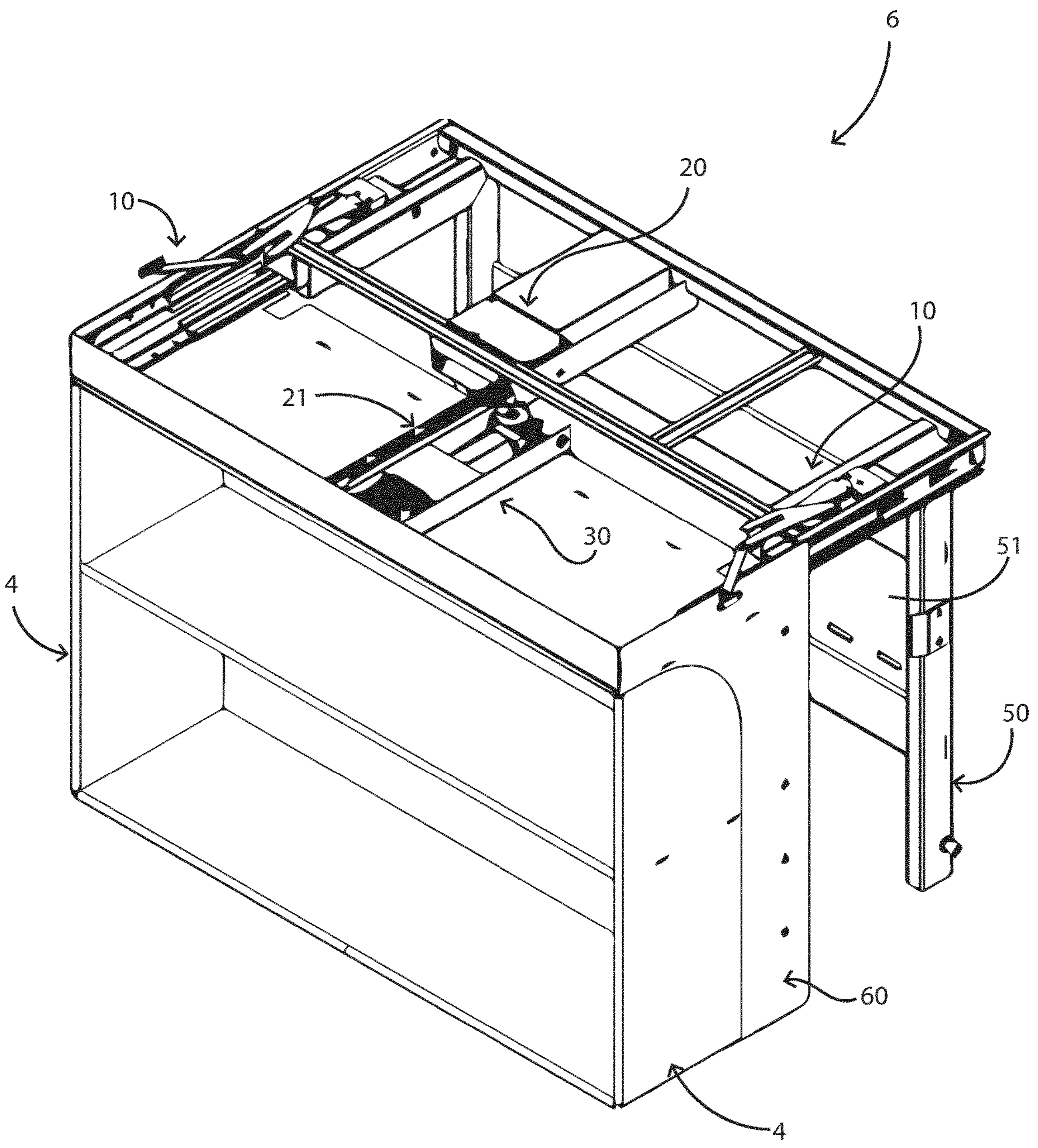
Figure 13D:
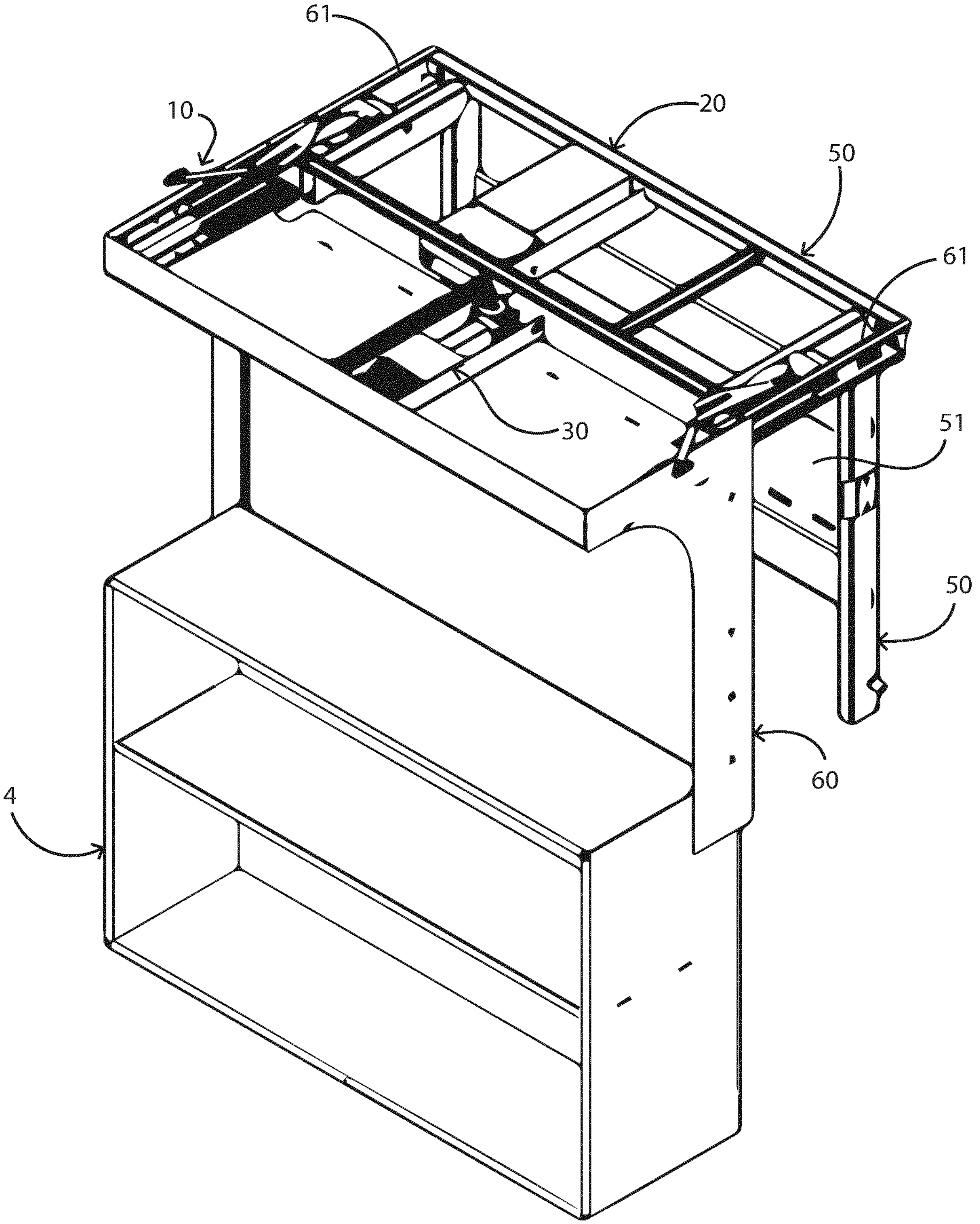

FIGS. 6(*a*), 6(*b*), 6(*c*), and 6(*d*) are plan views of the door mechanism being closed by the door mechanism under instruction from a user, showing in the latter two diagrams that there is automatic disengagement of the mechanism so that the door closes fully by way of its own soft-close hinge (conventional, not shown);

FIG. 7 is a plan view of the door mechanism with the door closed, showing that the mechanism's default position is disengaged so that the door can be opened and closed in a conventional manual manner by a user in absence of an instruction for driven opening;

FIG. 8 is a set of four perspective views, (a), (b), (c), and (d) showing operation of a forward extending or push/pull drive mechanism to push the shelving unit outwardly from its home position in the cabinet, in a push/pull manner with a single chain;

FIGS. 9(*a*) and 9(*b*) are plan and perspective views showing the apparatus with the shelving unit in its home position and the cabinet doors open, FIGS. 10(*a*) and 10(*b*) are plan and perspective views showing the apparatus with the shelving unit pushed outwardly part of the way, and FIGS. 11(*a*) and 11(*b*) are plan and perspective views showing the apparatus with the shelving unit pushed fully out from its home position into the extended top position;

FIG. 12 is a set of four views (a), (b), (c), and (d) showing a vertical drive mechanism of the apparatus at different positions, and FIG. 12(*e*) is an enlarged perspective view of this mechanism; and FIG. 13(*a*) is a perspective view showing the apparatus mounted to the shelving unit and before fitting to an existing cabinet, FIG. 13(*b*) is an enlarged perspective view of the apparatus with the push/pull drive mechanism having moved a shelving unit outwardly to part of the full travel, and FIG. 13(*c*) shows it when the shelving unit has been pully pushed forwardly from its home position, and FIG. 13(*d*) shows the apparatus after the vertical drive mechanism has operated to lower the shelving unit from its top extended position.

DETAILED DESCRIPTION OF THE EMBODIMENTS

Referring to FIG. 1 a cabinet 1 has a rectangular box-shaped housing 2 and a pair of doors 3, suitable to be mounted on a wall above a worktop. The cabinet 1 is conventional, and when closed, it has a conventional appearance. An internal storage unit 4 with shelves 5 is mounted within the cabinet, again in an arrangement which is typical in terms of storage of items in a kitchen or office or any other room.

An automated apparatus 6 with a frame 50 is secured to the wall and engages the shelving unit 4. The apparatus 6 is adapted to provide driven opening and closing of the cabinet doors 3, outward movement of the shelving unit 4, and subsequent downward movement of the shelving unit 4 so that it is accessible to disabled users. It also causes these movements in reverse. Because the movement is initially outward and then downward, the area under the cabinet 1 may be used in conventional manner. The apparatus 6 can then lift the shelving unit 4 directly upwardly into registry with the cabinet and then inwardly, and may, if desired, close the doors 3.

An able-bodied person can access the storage shelves 5 of the storage unit 4 as if the cabinet were conventional. However, the apparatus 6 also performs the functions of automatically opening the doors 3 in response to a user instruction to the controller, and likewise to push outwardly and then lower the storage unit 4 as shown in FIGS. 1 (*c*) and (*d*). This action brings the storage unit 4 down to the level of the worktop, or a different level if a worktop is not present, so that it is accessible to a user. It does so without affecting any items directly underneath the cabinet 1, such as a kettle on a worktop. The drive mechanisms also bring the storage unit back to the home position of FIG. 1(*a*) in response to user instructions.

Figure 1D:
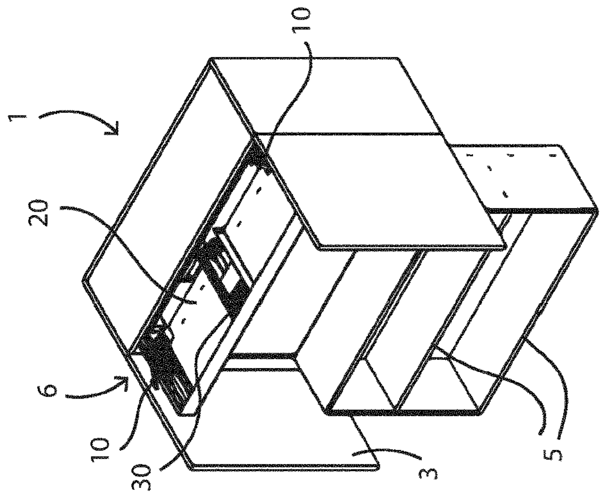
FIG. 1 is a set of four views (a), (b), (c) and (d), showing a drive apparatus of the invention installed in a cabinet through stages of doors opening and an internal shelving unit moving initially outwardly and then downwardly under automated drive control.
Figure 1C:
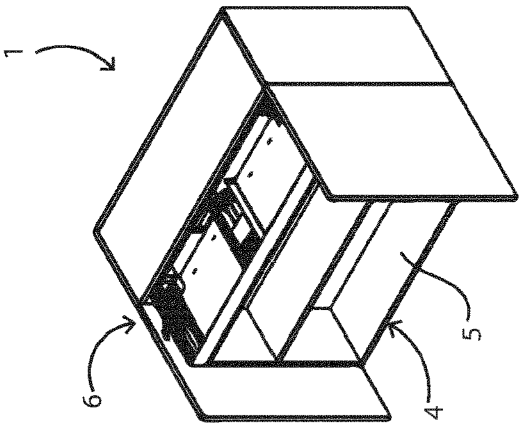
Figure 1B:
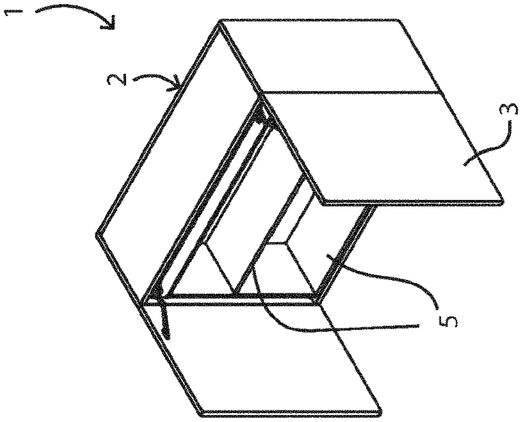
Figure 1A:
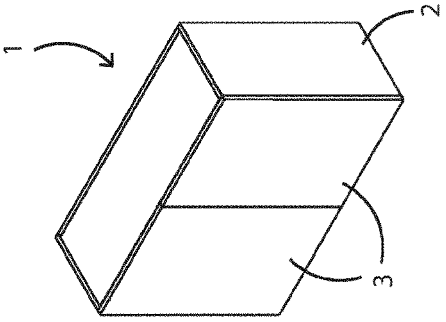
Figure 2:
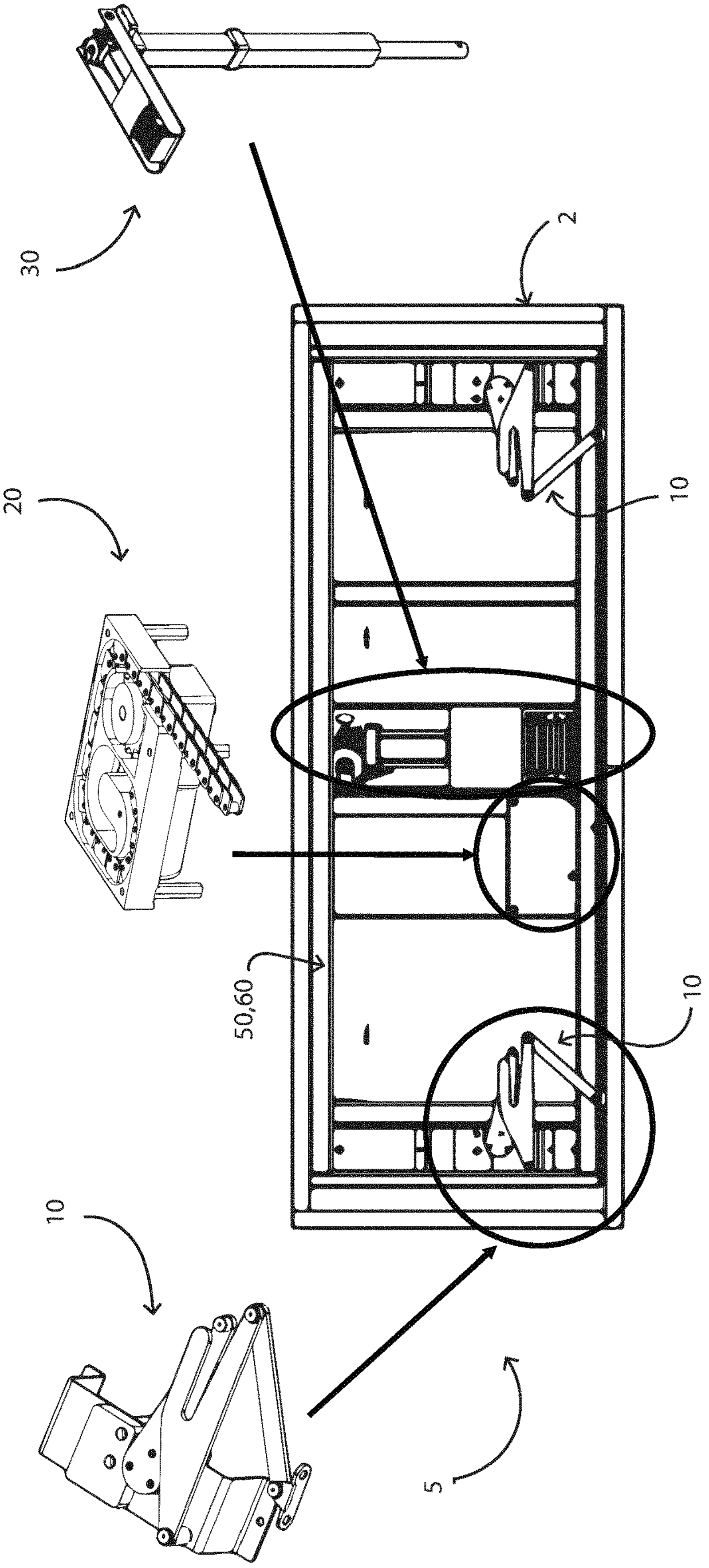
FIG. 2 is a top view of the apparatus, showing its three main drive mechanisms, and enlarged perspective views of the mechanisms.

A door drive mechanism 10 is shown in FIGS. 2 to 7. FIG. 2 also shows a horizontal drive mechanism 20 for pushing the storage unit 4 outwardly and subsequently retracting it, and a vertical drive mechanism 30 for lowering and lifting the storage unit 4. The mechanisms 10 and 20 are mounted directly to the frame 50, the mechanism 30 is mounted to a frame 60 which is in turn mounted to frame 50 which is in turn mounted to the wall and are fully contained within the cabinet housing 2 to which the automated apparatus 6 has been fitted. These are best viewed in FIG. 13(*d*).

Door Drive Mechanism 10

Figure 3:
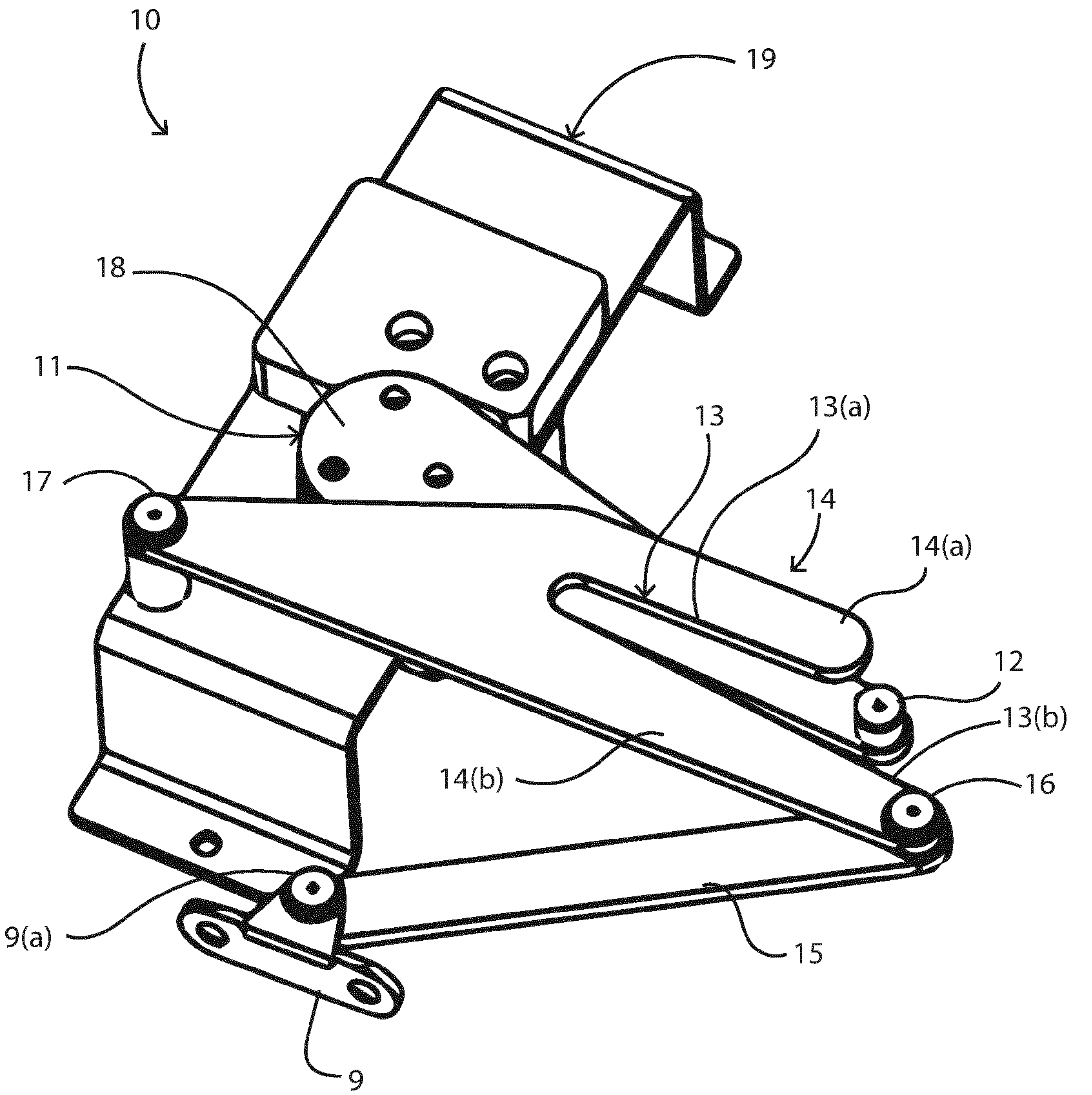
FIG. 3 is a perspective view of a door mechanism of the apparatus.

As shown in FIG. 3 the door drive mechanism 10 comprises a drive arm 11 with a roller/pin/spigot 12 at its end and being pivotally mounted for rotation about a vertical axis by a joint 18 driven by a motor, not shown, beneath a supporting bracket 19. A driven arm 14 has a slot 13, and a pivot joint 16 at the end of the arm 14 is linked to an outer link 15, in turn linked by a pivot joint 9(*a*) to a bracket 9. The bracket 19 is secured to the frame 50, and the bracket 9 is secured to the cabinet door 3.

The driven arm 14 is bifurcated with forked members 14(*a*) and 14(*b*) between which there is a slot 13 defined by opposed edges 13(*a*) and 13(*b*) which are tapered to diverge with a small angle The innermost edge 13(*a*) and member 14(*a*) are shorter than the outermost edge 13(*b*) and member 14(*b*). The relative positions of the pivot joints 18 and 17 of the arms 11 and 14 respectively and the configuration of the arms 13 and 14 allow movement of the roller 12 into and out of engagement with the slot 13 as the arms 11 and 14 both rotate.

Figure 4A:
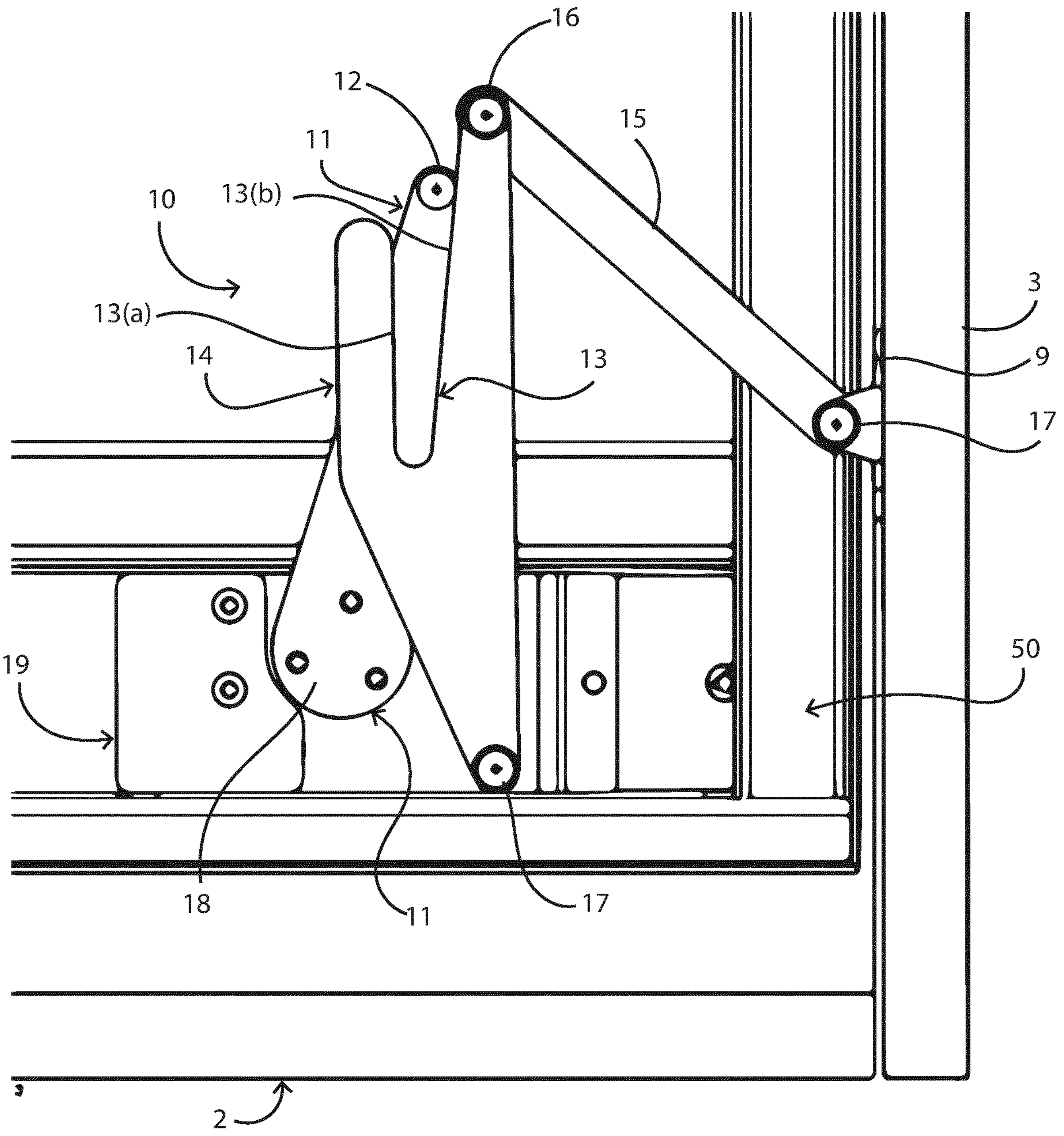
FIG. 4(*a*) is a plan view of the door mechanism with the door closed, FIG. 4(*b*) is a plan view as the door is driven to open in an automated manner under instruction from a user, and FIG. 4(*c*) is a plan view of this mechanism when it has fully opened the door.
Figure 4B:
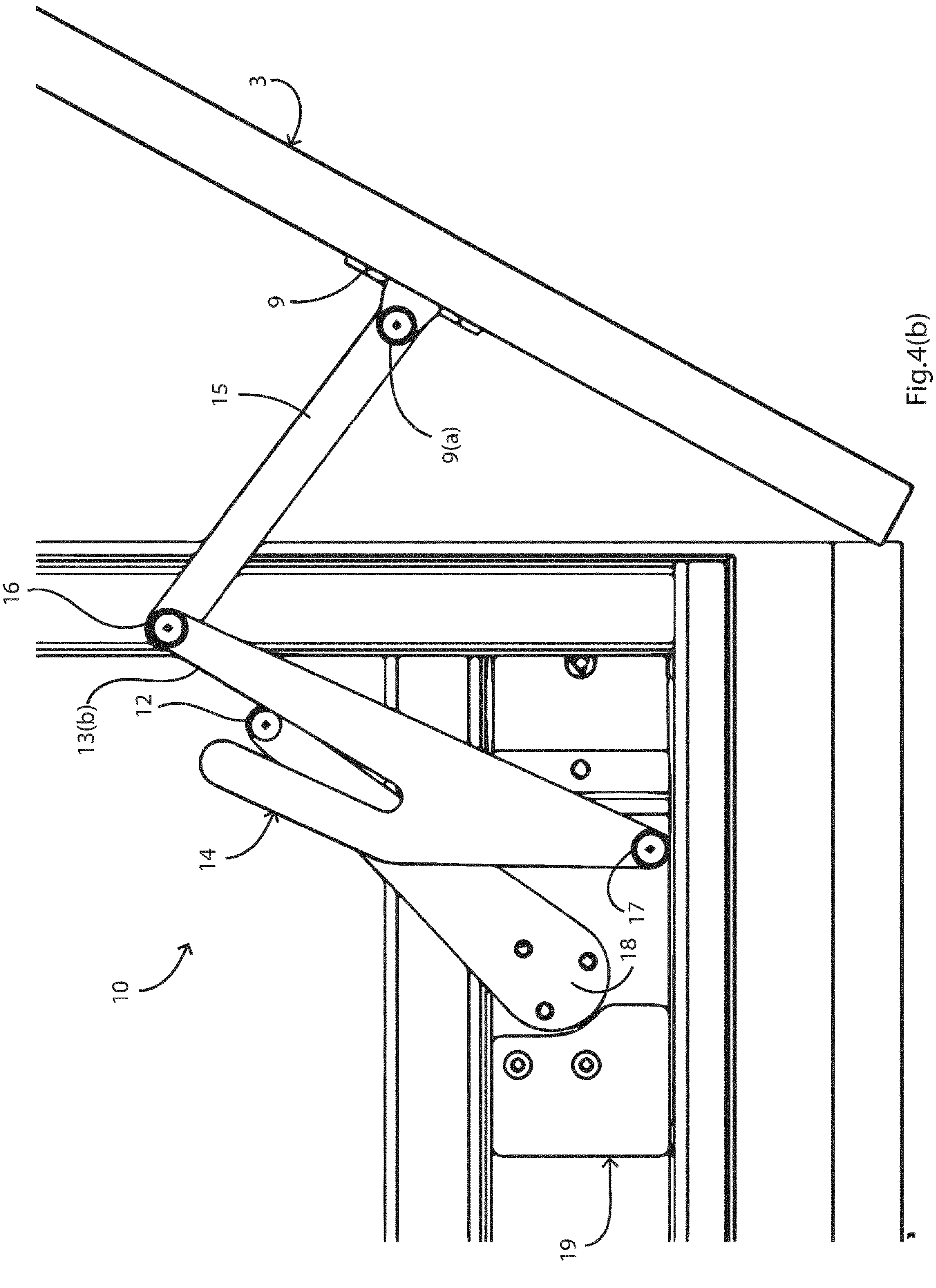
Figure 4C:
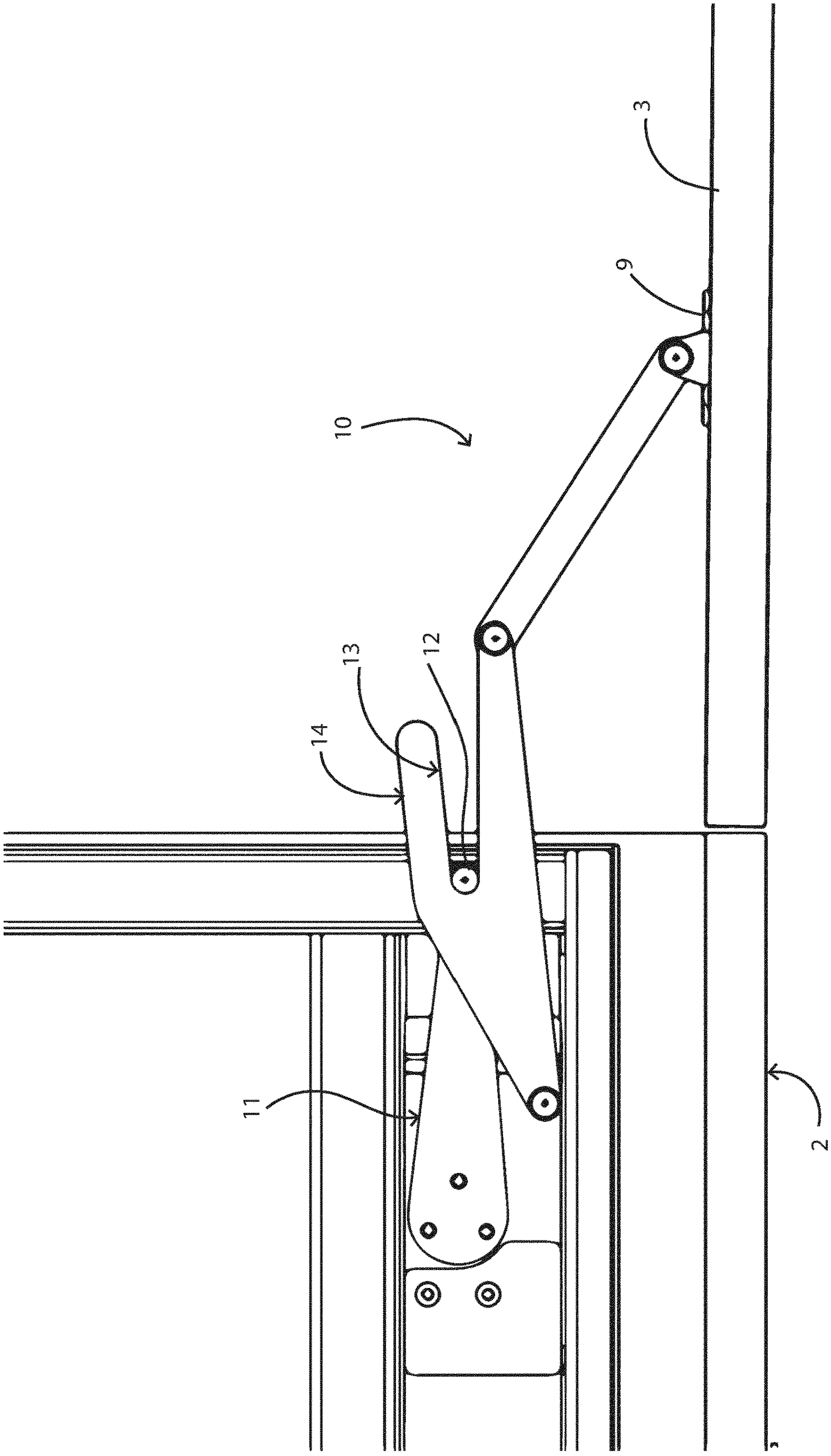

Hence, upon rotation of the drive arm 11 as shown in FIGS. 4(*a*), 4(*b*), and 4(*c*) the roller/pin/spigot 12 engages the driven arm 14 by abutment with the outermost slot edge 13(*b*) to cause the driven arm 14 to rotate outwardly to open the door. FIGS. 4(*a*), (*b*), and (*c*) show the progression from closed to partly open, to fully open. This automatic drive is caused by the apparatus 6 controller instructing the motor driving the pivot joint 18, upon receipt of an instruction for automated door 3 opening. The controller is mounted to the frame 50 in an enclosure behind the drive mechanism 20.

The relative positions of the arms 11 and 14 and their configurations are such that the roller/pin/spigot 12 is not within the slot 13 when the arms are closed or close to being closed. This allows the door to be manually opened in conventional manner without movement of the drive arm 11, when desired by an able-bodied user for example. It also allows freedom for a door hinge to complete the door closing action for a "soft close" in conventional manner. It has been found that the action of a roller on a drive arm engaging in a slot of a driven arm is a simple and robust arrangement with minimal wear on the motor because the point of contact between the drive and driven arms is well spaced-apart from the door hinge axis.

Figure 5A:
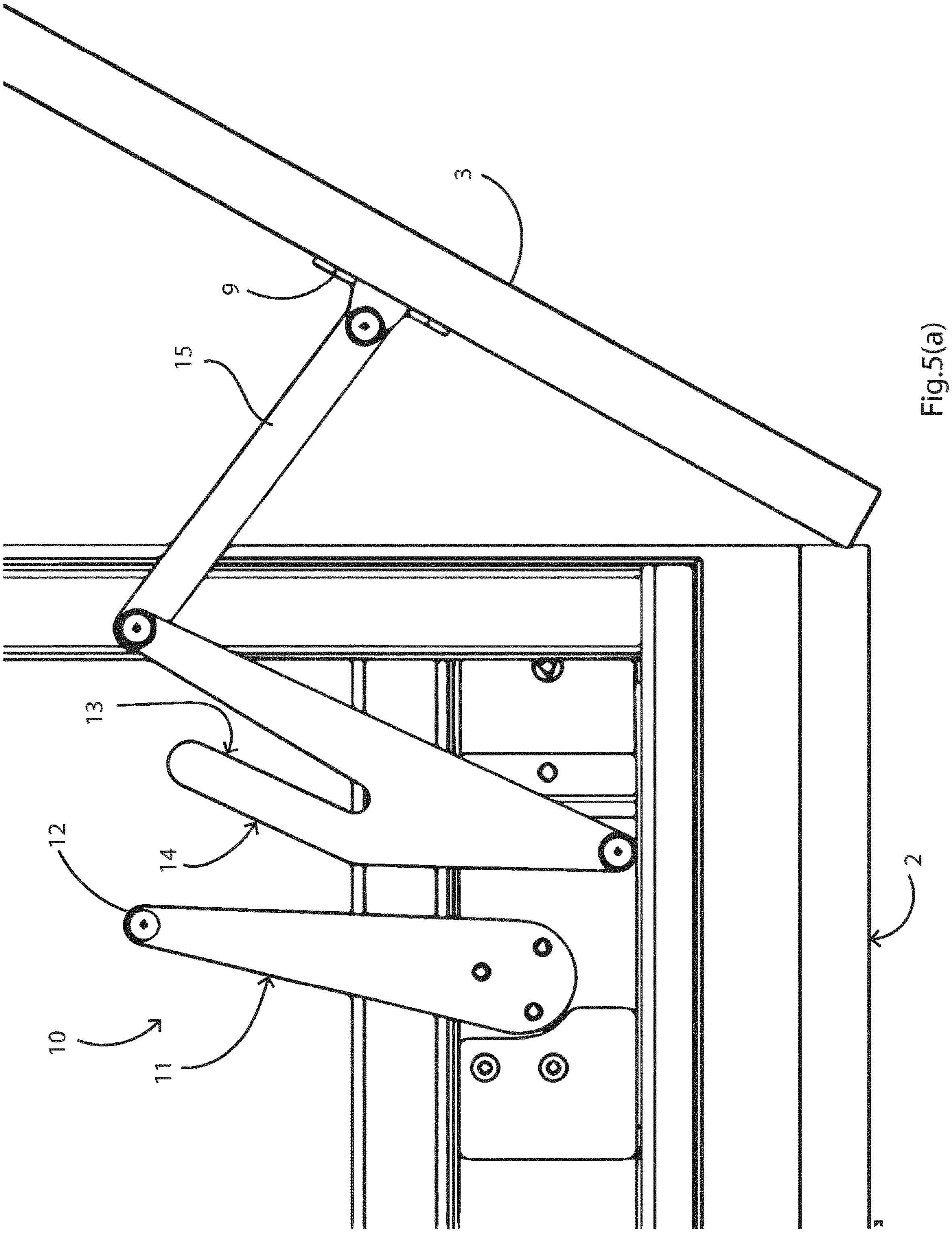
FIG. 5(*a*) is a plan view of the door mechanism with the door being opened manually by an able-bodied user, in which the door mechanism is disengaged automatically, and FIG. 5(*b*) is a plan view of this mechanism when the door has been fully opened manually.
Figure 5B:
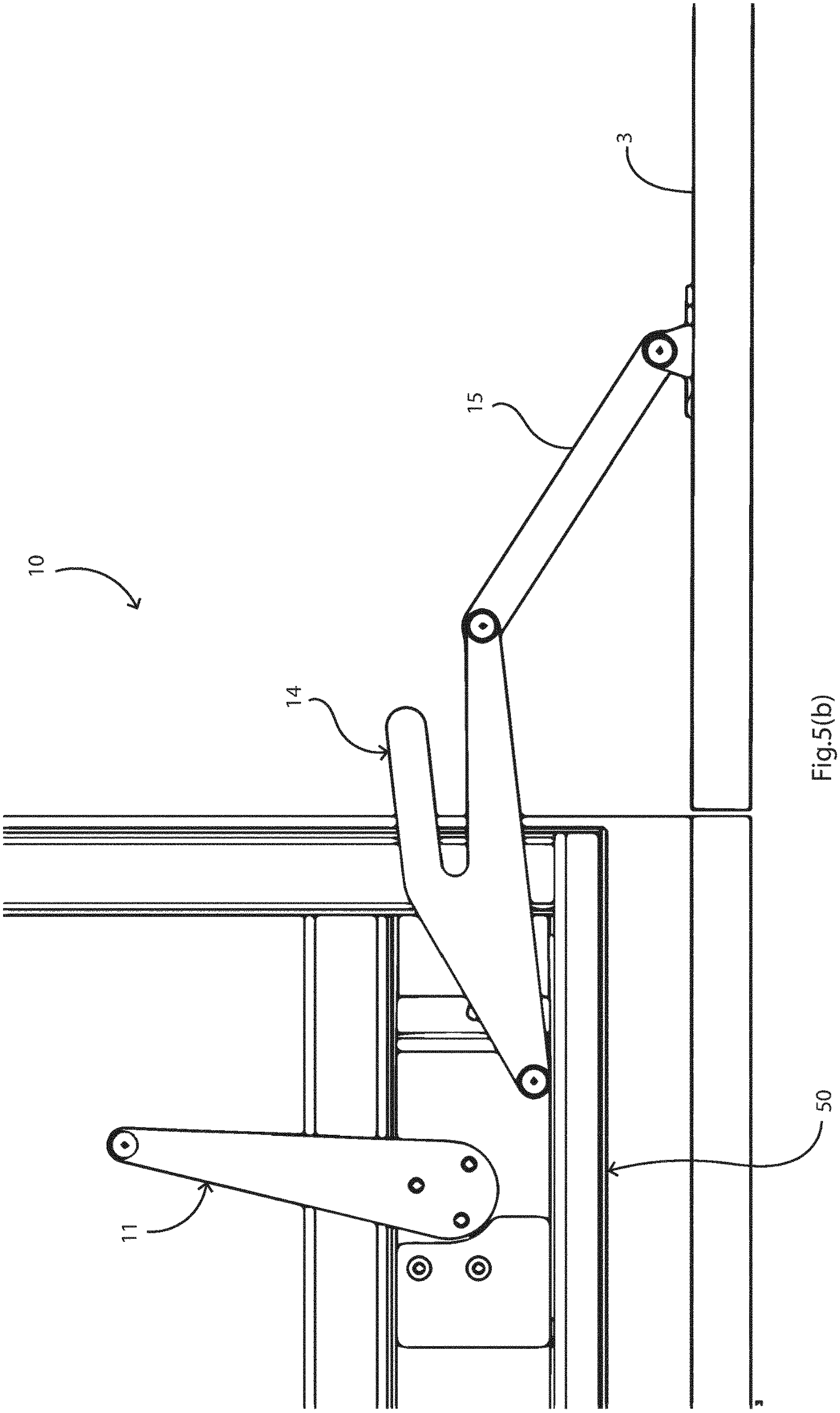
Figure 6A:
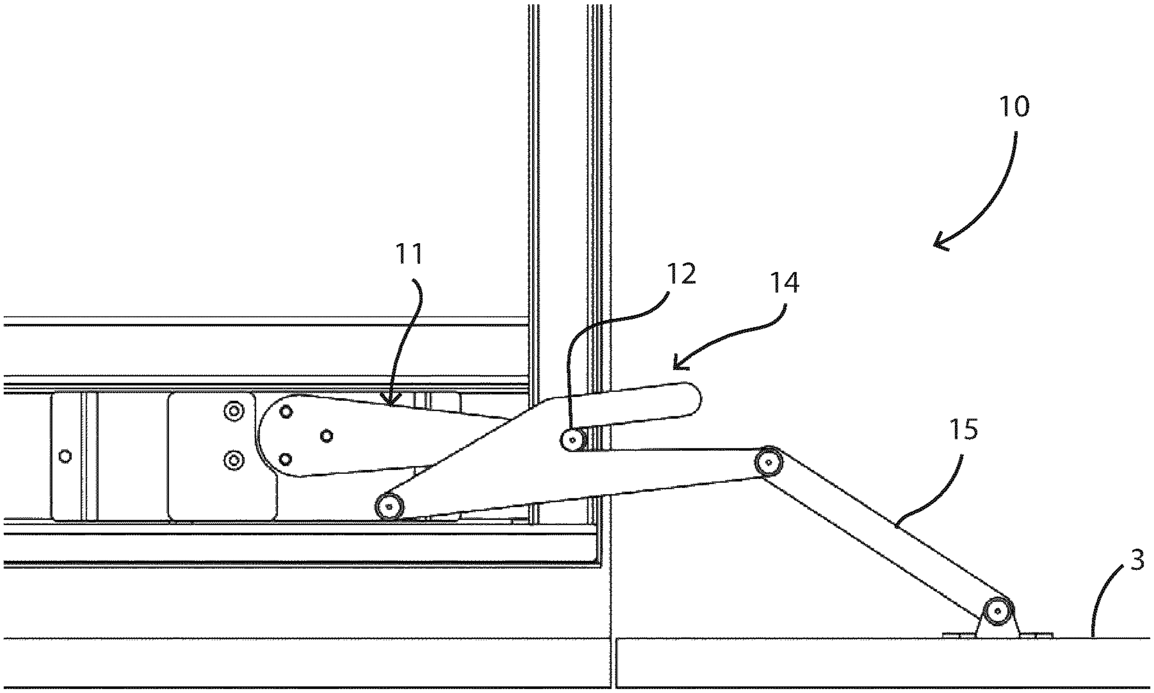
Figure 6B:
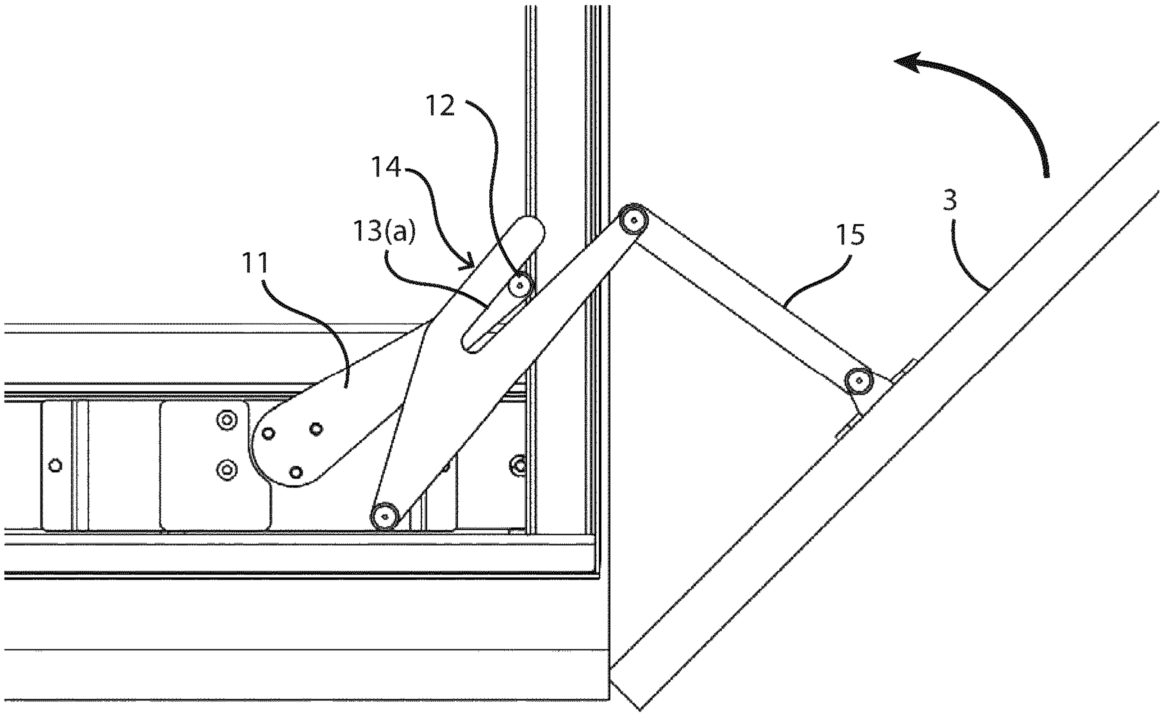
Figure 6C:
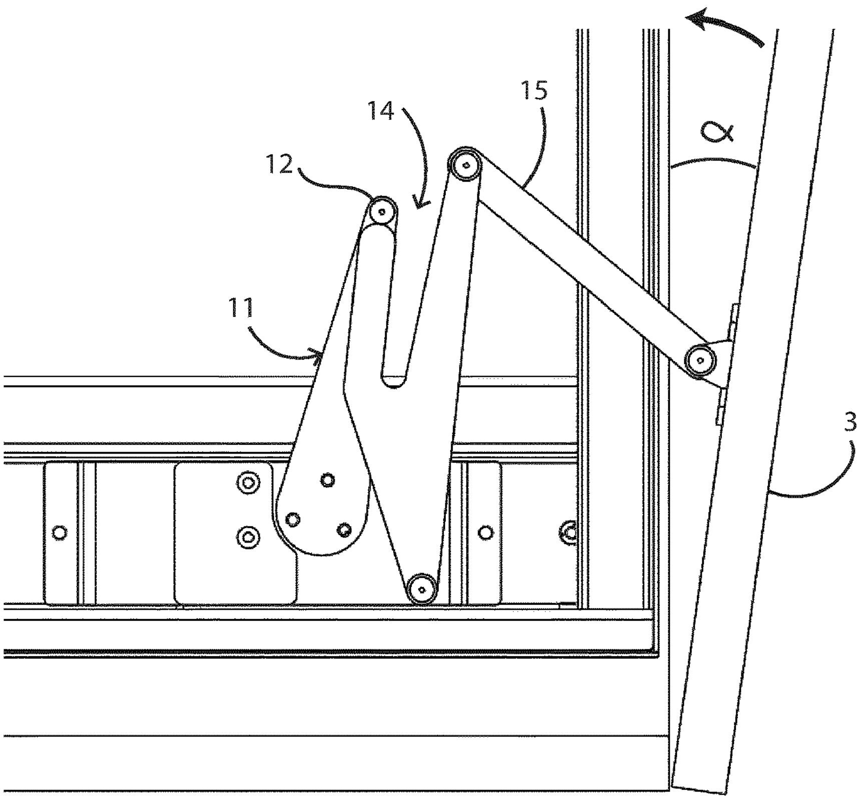
Figure 6D:
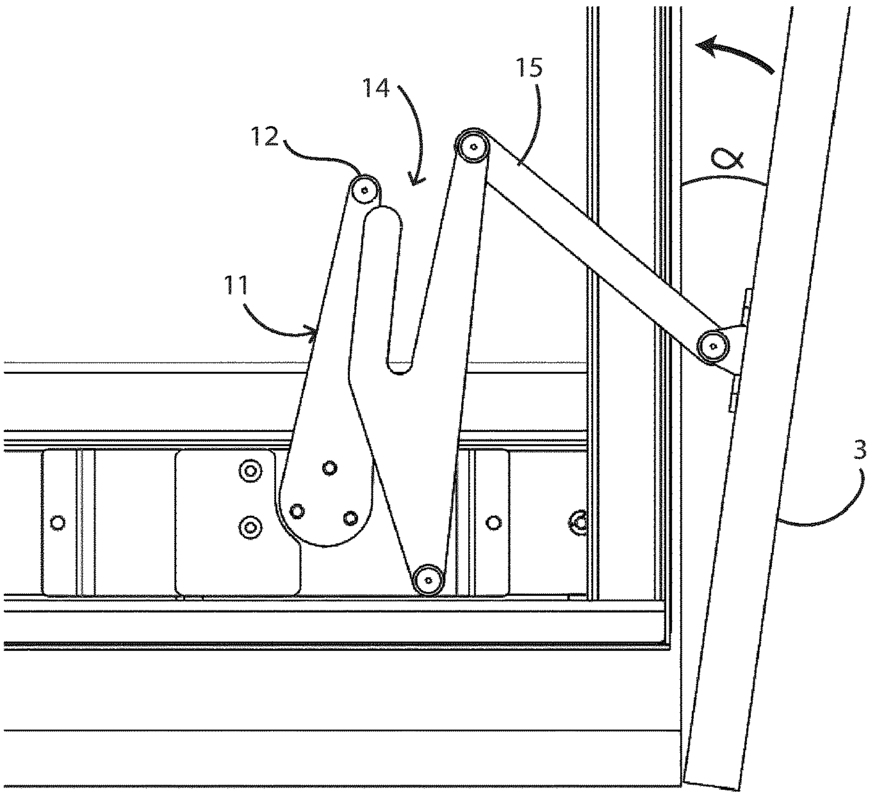

In more detail, FIG. 5(*a*) shows the door being opened manually by an able-bodied user, in which the door drive mechanism 10 is disengaged automatically because the arm 14 is simply rotated away from the arm 11. Because the roller 12 is not within the slot 13 when the door is closed the drive arm 11 is simply left idle during manual door opening. FIG. 5(*b*) shows the mechanism 10 when the door 3 has been fully opened manually, showing again disengagement of the drive arm 11 from the driven arm 14. It will be appreciated that for manual door opening the door drive mechanism 10 is passive, with the drive arm 11 playing no role, and the driven arm 14 and the link being passive items complementing the door's own conventional hinge (not shown).

FIGS. 6(*a*), 6(*b*), 6(*c*), and 6(*d*) show the door mechanism being closed by the door drive mechanism under instruction from a user. For this to happen the door needs to have been opened automatically as shown in FIGS. 4(*a*) to (*c*). In this situation, when the door 3 is fully open the roller/pin/spigot 12 is engaged in the slot (FIG. 6(*a*)), and upon the controller receiving an instruction it causes the arm 11 to move counter-clockwise as viewed in plan. This causes the roller/pin/spigot 12 to push against and ride along the innermost slot edge 13(*a*) and push the driven arm 14 counter-clockwise, the driven arm thereby 14 pulling (FIG. 6(*b*)) the link 15 and the door 3 in a closing action. As shown in FIGS. 6(*c*) and 6(*d*) when the door has closed to a major extent leaving only a small angle α the roller 12 rides beyond the edge 13(*a*), moves out of the slot 13 and disengages from the arm 14.

This allows the door's own hinge to complete the closing action in the conventional "soft-close" manner, shown in FIG. 7. Importantly, this avoids a pinch point and hence provides excellent safety due to the complete physical disengagement which happens due to the relative positions and physical configurations of the arms 11 and 14. In this position the arms 11 and 14 are disengaged and the door is ready for either manual or automated driven opening as desired by the user. The automatic disengagement of the mechanism as the door closes fully is particularly beneficial at providing reliability, safety, and versatility in use. Pinch points are avoided and the door may be then readily re-opened either manually or automatically.

In other examples, the invention provides one or more door drive mechanisms 10 for fitting to cabinets without the mechanisms 20 and 30.

Push/Pull Drive Mechanism 20

The horizontal drive mechanism 20 is shown in more detail in FIG. 8. This comprises a chain 21 travelling in a track 23 in a housing 25 mounted to the frame 50 and driven by a sprocket 22. Upon rotation of the sprocket 22 by a motor (not shown) the chain 21 extends from the housing 25 thereby pushing the storage unit 4 outwardly in a controlled manner on rails 53 of the apparatus frame 50 which are akin to conventional drawer rails. Anti-clockwise rotation (as viewed in plan) of the sprocket 22 causes the chain 21 to retract into the housing 25 to pull the unit 4 back into the home position. This is also a simple and robust arrangement.

FIGS. 9(*a*) and 9(*b*) show the mechanism 20 with the shelving unit 4 in its home position and the cabinet doors open, FIGS. 10(*a*) and 10(*b*) show the shelving unit 4 pushed outwardly part of the way, and FIGS. 11(*a*) and 11(*b*) show the apparatus with the shelving unit 4 pushed fully out from its home position. The overall apparatus is affixed to its own frame 50 which is secured to the wall, and the shelving unit 4 which in turn is mounted to the frame 60 is pushed outwardly relative to the frame 50 and hence with respect to the cabinet 1. FIGS. 13(*a*), (*b*), and (*c*) also show this clearly.

As shown most clearly in FIGS. 11(*a*) and 11(*b*) the chain 21 maintains a straight shape from its own strength as the chain is a push/pull chain and it self-locks keeping the straight shape when extended. A push-pull directional single chain drive is particularly suitable for this purpose, being compact, strong, reliable, and robust.

Vertical Drive Mechanism 30

Referring to FIG. 12 the vertical drive mechanism 30 to lower and lift the unit 4 comprises a motor and gearbox 31 which engages a lead screw 32 extending through a tube 34. The gearbox 31 is driven by a motor and controlled by the main controller, and the horizontal components of the mechanism 30 are housed within a channel 36. The channel 36 is secured to a slidable frame 60 which is slidable horizontally relative to the frame 50, on rails 53.

Because the mechanisms 10 and 20 and the slidable frame 60 (which has mechanism 30 mounted to it) are mounted to the frame 50, the overall apparatus 6 is self-contained. It only needs to be secured to the wall by its rear plate 51, and to the doors 3 by the brackets 9.

FIG. 13(*a*) shows the apparatus 6 in the fully retracted/closed position with the shelving unit 4 retracted/closed and within the slidable frame 60, with the frame 60 fully retracted/closed within the frame 50, the cabinet housing 2 being omitted for clarity. FIG. 13(*b*) shows the horizontal drive mechanism 20 having moved the slidable frame 60 and hence the shelving unit 4 outwardly to part of the full travel. This outward movement is relative to a frame 50 of the apparatus, this frame having the rear plate 51 for securing to the wall. FIG. 13(*c*) shows it when the shelving unit 4 has been fully pushed forwardly by the mechanism 20 to the top extended position. FIG. 13(*d*) shows the apparatus after the vertical drive mechanism 30 has operated to lower the shelving unit 4 from its top extended position within the slidable frame 60 to a lower position of the frame 60. The shelving unit 4 remains within in the frame 60 at all horizontal upper positions, and moves vertically relative to the frame 60 under action of the vertical drive mechanism 30.

Additional Control Aspects

The apparatus 6 controller is responsible for sequencing the operations of motors and actuators so that the shelving unit 4 can be safely and reliably brought within reach of the user and then returned to the stowed position within a standard wall cabinet 1. The sequencing of operation that brings the storage or shelving unit 4 within the reach of the user is referred to as ‘deployment’. The sequencing of operations that returns it back to the stowed position within the wall cabinet may be referred to as ‘retraction’.

The deployment is initiated by a control input from the user. This instruction can be provided in various examples of the invention using any one or more of different platforms such as smartphone, smart home control, or voice. If the storage unit 4 is fully retracted, the control input will cause the apparatus to deploy. If fully deployed the control input will cause the automated retraction. If the apparatus is in the process of retraction or deployment and a control input is detected, the controller will stop the deployment or retraction operation. In this state if the control input is detected the controller will reverse its previous operation. For example, if the apparatus is deploying when the control input is detected then the deployment operation will stop and the next application of the control input will cause retraction. The sequencing logic allows the user to stop the deployment or retraction should there be an obstacle in the way of the trajectory.

Sequencing of the door opening/closing and the horizontal and vertical translation operations are controlled by limit sensors (for example, optical, magnetic, inductive, capacitive, contact) and/or positional encoders.

For safe deployment and retraction of the relevant motor current may also be measured during operation and compared to expected values that are compatible with the rate of deployment as measured by the positional encoders.

An uncharacteristic change of movement speed with respect to motor current will cause the active operation to stop as it is indicative of a potential obstacle being encountered. Motor speed and current characteristics can be measured, updated and stored during a ‘learning’ operation that can be initiated by the user. On every deployment or retraction, the measured motor current will differ depending on the weight of the objects placed within the storage unit 4. The current demand of the motors or actuators will be measured and stored as a reference, once a constant speed has been achieved. This current and speed will be compared against the instantaneous current and speed during the remainder of the movement. If the speed or current differ by more than is typical, the movement of the actuator or motor will be brought to a stop.

As the user may place objects of varying weights in or remove them from the unit 4, motor currents may vary significantly. A load cell or other weight or force measurement device may be used to predict the increase or decrease in motor current to refine the acceptable motor current operating envelope.

The lower and upper faces of the unit 4 and/r the cradle 60 may be fitted with one or more sensors that are able to detect collision with or proximity to obstacles. Once collision or proximity is detected the deployment or retraction operation will be halted.

The lower part of the unit 4 may have one or more temperature sensors mounted on it so that the temperature of its immediate surroundings can be compared to the ambient temperature, as detected by a sensor placed elsewhere in the apparatus or sensed remotely. Should a significant differential between the ambient temperature or an absolute threshold be reached or exceeded, by the sensor or sensors mounted on the on the lower face of the automated unit, the controller will cease all movement and alert the user by an audible and/or visual indication and/or communication of the error condition.

Should the temperature of the lower face of the unit 4 reach or exceed a threshold value, the automated unit, if fully or partially deployed, will attempt to execute an un-commanded retraction operation. These features provide safety in the event of the unit 4 being moved close to a hot kettle or other cooking device for example.

Advantages of the Invention

It will be appreciated that the invention provides for use of a cabinet in a conventional manner such as by able-bodied people, and there isn't even visibility of the mechanisms. However, for use in a more convenient manner or by the user the controller with a digital data processor can operate the motors to initially open the doors 3, and then move the storage unit 4 outwardly and then down to the required level for easy access. It can subsequently reverse these actions to bring the storage unit 4 back into the cabinet housing 2. The mechanisms are very conveniently configured and located for minimising space which they take up, and not affecting use of the cabinet in a conventional manner. It is particularly beneficial that the door drive disengages near the door closed position, thereby allowing manual opening if the motor is not activated, and also allowing a soft-close sprung hinge where desired.

The apparatus which can be fitted into a standard kitchen wall storage cabinet. This allows easy retrofitting to existing cabinets/presses. There is no need to modify the surrounding wall or furniture, for example the wall underneath the cabinet may have the usual tiling or other decoration without any impact by the apparatus. Hence, a kitchen may have the exact same appearance as a conventional kitchen. A user who moves into a dwelling with existing kitchen furniture may have the apparatus installed without any change to the appearance of the existing furniture, and use of the existing furniture by able-bodied users is not affected. Also, the apparatus is not exposed/visible because the drive mechanisms are above the shelving unit, and because the mechanisms fully fit within an existing cabinet.

While the apparatus can be provided together with a cabinet, it does not need to be so provided, as it can fit within an existing cabinet shell, and performs the advantageous automated outward and downward movements. Moreover, the apparatus may be connected to any desired item of furniture with our without a cabinet, the important point being that it provides the initial horizontal and subsequent vertical actions during deployment.

There is complete versatility as the door may be opened and closed by an able-bodied user as if the apparatus did not exist.

The apparatus advantageously has three main mechanical movements which complement each other:

- Motor driven mechanism to open and close the door/doors on a standard cabinet. The mechanism allows the door/doors of the cabinet to be open and closed both manually and automatically.
- Motor driven mechanism to extend out beyond the front edge of the standard wall cabinet and retract the shelving part of the unit in and out of the wall cabinet.
- Motor driven mechanism to lower and raise the shelving.
- Because the action is initially outward and then downward, the user may use a kitchen worktop in the normal manner, by for example having items such as a kettle placed on it. This would not be possible if the shelving were lowered initially and then moved outwardly.

The drive for the out-in action is advantageously performed by a push/pull chain drive, avoiding use of closed-loop mechanism wires or belts. The push/pull drive mechanism is very simple and effective.

The invention is not limited to the embodiments described but may be varied in construction and detail. For example, it is envisaged that the drive may operate in a rotary manner to move the storage unit out of the cabinet and down, through an arc. This is however not as compact and simple as the described drive mechanisms. In the door drive, the drive and driven members may be other than arms, for example they could be gears, such as spur gears, which move into and out of engagement.

The invention claimed is:

1. A drive apparatus for a furniture unit, the apparatus comprising:
- a controller with a user interface,
- a frame for securing to a wall,
- a push-pull drive mechanism to push the unit outwardly from a home position to a top extended position, and
- a vertical drive mechanism to lower the unit from said top extended position to a level at which it is more accessible, and to subsequently lift the unit upwardly back to the top extended position, and
- in which the push-pull drive mechanism is adapted to retract the unit from said top extended position to the home position under control of the controller,
- the push/pull drive mechanism including a chain for engaging a furniture unit and a sprocket to rotate to push the chain outwardly and pull the chain inwardly, wherein the chain movement is parallel to the push and pull direction, and wherein the chain is housed in a curved pathway alongside which the sprocket is mounted.

2. The apparatus as claimed in claim 1, wherein the vertical drive mechanism comprises a lead screw drive having a lead screw for engaging a furniture unit.

3. The apparatus as claimed in claim 1, further comprising a door drive mechanism to open and close a door.

4. The apparatus as claimed in claim 1, further comprising a door drive mechanism to open and close a door, wherein the door drive mechanism comprises a drive member and a driven member mutually positioned such that they are not engaged when the door is at or close to a closed position, and outward movement of the drive member causes full engagement with the driven member.

5. The apparatus as claimed in claim 1, further comprising a door drive mechanism to open and close a door, wherein the door drive mechanism comprises a drive member and a driven member mutually positioned such that they are not engaged when the door is at or close to a closed position, and outward movement of the drive member causes full engagement with the driven member, and wherein the door drive mechanism drive member comprises a rotating drive arm and the driven member comprises a rotating driven arm, and said arms are mutually located and configured such that initial rotation of the drive arm brings it into engagement with the driven arm, and further rotation in the same direction causes full engagement and force on the driven arm for opening of a door connected to the driven member.

6. The apparatus as claimed in claim 1, further comprising a door drive mechanism to open and close a door, wherein the door drive mechanism comprises a drive member and a driven member mutually positioned such that they are not engaged when the door is at or close to a closed position, and outward movement of the drive member causes full engagement with the driven member, and wherein the door drive mechanism drive member comprises a rotating drive arm and the driven member comprises a rotating driven arm, and said arms are mutually located and configured such that initial rotation of the drive arm brings it into engagement with the driven arm, and further rotation in the same direction causes full engagement and force on the driven arm for opening of a door connected to the driven member, and wherein the driven arm has a slot formed by an inner shorter member and an outer longer member, so that outward rotation of the drive arm brings it into engagement with the longer member in a door opening action.

7. The apparatus as claimed in claim 1, further comprising a door drive mechanism to open and close a door, wherein the door drive mechanism comprises a drive member and a driven member mutually positioned such that they are not engaged when the door is at or close to a closed position, and outward movement of the drive member causes full engagement with the driven member, wherein the drive member and the driven member are mutually positioned and configured such that when a door-closed position approaches with a small angle α remaining to a fully closed position the drive member disengages from the driven member.

8. An apparatus as claimed in claim 1, further comprising a door drive mechanism to open and close a door, wherein the door drive mechanism comprises a drive member and a driven member mutually positioned such that they are not engaged when the door is at or close to a closed position, and outward movement of the drive member causes full engagement with the driven member, wherein the drive member and the driven member are mutually positioned and configured such that when a door-closed position approaches with a small angle α remaining to a fully closed position the drive member disengages from the driven member, wherein the driven member has a slot formed by an inner shorter member and an outer longer member, so that outward rotation of the drive member brings it into engagement with the longer member in a door opening action; and wherein inward motion of the drive arm causes it to move out of said slot at a position where a door is nearly closed.

9. The apparatus as claimed in claim 1, further comprising a door drive mechanism to open and close a door, wherein the door drive mechanism comprises a drive member and a driven member mutually positioned such that they are not engaged when the door is at or close to a closed position, and outward movement of the drive member causes full engagement with the driven member, and wherein the driven arm is linked by a pivot joint to a link arm which is in turn linked by a pivot joint to a bracket for fixing to a door.

10. The apparatus as claimed in claim 1, further comprising a door drive mechanism to open and close a door, wherein the door drive mechanism comprises a drive member and a driven member mutually positioned such that they are not engaged when the door is at or close to a closed position, and outward movement of the drive member causes full engagement with the driven member, wherein the door arm comprises a roller/pin/spigot at or near an extremity of the drive arm, for engagement in the slot of the driven arm.

11. The apparatus as claimed in claim 1, wherein the controller is configured to stop a current drive mechanism operation if an obstacle is detected or a contrary user instruction is received, and to reverse its movement, and wherein the apparatus comprises sensors and the controller is configured to provide control instructions to the mechanisms according to both user instructions and sensor signals, and wherein said sensors include one or more of optical, magnetic, inductive, capacitive, contact, and positional encoder sensors.

12. The apparatus as claimed in claim 1, further comprising at least one load sensor, and the controller is configured to determine a parameter value representing weight of a storage unit connected to the apparatus and to determine expected motor demand electrical parameter values accordingly, and wherein the apparatus comprises at least one proximity sensor, and the controller is configured to stop a movement if an obstacle is detected.

13. A cabinet comprising a storage unit and a drive apparatus arranged to move the storage unit to and from a home position within the cabinet, wherein the drive apparatus comprises comprising:

a controller with a user interface, a frame for securing to a wall, a push-pull drive mechanism to push the storage unit outwardly from a home position to a top extended position, and a vertical drive mechanism to lower the storage unit from said top extended position to a level at which it is more accessible, and to subsequently lift the unit upwardly back to the top extended position, and in which the push-pull drive mechanism is adapted to retract the storage unit from said top extended position to the home position under control of the controller, the push/pull drive mechanism including a chain for engaging a furniture unit and a sprocket to rotate to push the chain outwardly and pull the chain inwardly, wherein the chain movement is parallel to the push and pull direction, and wherein the chain is housed in a curved pathway alongside which the sprocket is mounted.

14. The cabinet as claimed in claim 13 further comprising a door for said storage unit and a door drive mechanism to open and close said door, said door drive mechanism comprising a drive member and a driven member for engaging the door, the drive and the driven members being mutually positioned and configured such that they are not engaged when the door is at or close to a closed position, and outward movement of the drive member causes full engagement with the driven member to open the door.

15. The cabinet as claimed in claim 13 further comprising a door for said storage unit and a door drive mechanism to open and close said door, said door drive mechanism comprising a drive member and a driven member for engaging the door, the drive and the driven members being mutually positioned and configured such that they are not engaged when the door is at or close to a closed position, and outward movement of the drive member causes full engagement with the driven member to open the door, and wherein the drive member comprises a rotating drive arm and the driven member comprises a rotating driven arm, and said arms are mutually located and configured such that initial rotation of the drive arm brings it into engagement with the driven arm, and further rotation in the same direction causes full engagement and force on the driven arm for opening of the door connected to the driven member.

16. The cabinet as claimed in claim 13 further comprising a door for said storage unit and a door drive mechanism to open and close said door, said door drive mechanism comprising a drive member and a driven member for engaging the door, the drive and the driven members being mutually positioned and configured such that they are not engaged when the door is at or close to a closed position, and outward movement of the drive member causes full engagement with the driven member to open the door, and wherein the drive member comprises a rotating drive arm and the driven member comprises a rotating driven arm, and said arms are mutually located and configured such that initial rotation of the drive arm brings it into engagement with the driven arm, and further rotation in the same direction causes full engagement and force on the driven arm for opening of the door connected to the driven member, and wherein the driven arm has a slot formed by an inner shorter member and an outer longer member, so that outward rotation of the drive arm brings it into engagement with the longer member in a door opening action.

17. The cabinet as claimed in claim 13 further comprising a door for said storage unit and a door drive mechanism to open and close said door, said door drive mechanism comprising a drive member and a driven member for engaging the door, the drive and the driven members being mutually positioned and configured such that they are not engaged when the door is at or close to a closed position, and outward movement of the drive member causes full engagement with the driven member to open the door, and wherein the drive member comprises a rotating drive arm and the driven member comprises a rotating driven arm, and said arms are mutually located and configured such that initial rotation of the drive arm brings it into engagement with the driven arm, and further rotation in the same direction causes full engagement and force on the driven arm for opening of the door connected to the driven member, and wherein the drive arm and the driven arm are mutually positioned and configured such that when a door-closed position approaches with a small angle $\alpha$ remaining to a fully closed position the drive arm disengages from the driven arm.

18. The cabinet as claimed in claim 13 further comprising a door for said storage unit and a door drive mechanism to open and close said door, said door drive mechanism comprising a drive member and a driven member for engaging the door, the drive and the driven members being mutually positioned and configured such that they are not engaged when the door is at or close to a closed position, and outward movement of the drive member causes full engagement with the driven member to open the door, and wherein the drive member comprises a rotating drive arm and the driven member comprises a rotating driven arm, and said arms are mutually located and configured such that initial rotation of the drive arm brings it into engagement with the driven arm, and further rotation in the same direction causes full engagement and force on the driven arm for opening of the door connected to the driven member, and wherein the drive arm and the driven arm are mutually positioned and configured such that when a door-closed position approaches with a small angle $\alpha$ remaining to a fully closed position the drive arm disengages from the driven arm, and wherein the driven arm has a slot formed by an inner shorter member and an outer longer member, so that outward rotation of the drive arm brings it into engagement with the longer member in the door opening action; and wherein inward motion of the drive arm causes it to move out of said slot.

19. The cabinet as claimed in claim 13 further comprising a door for said storage unit and a door drive mechanism to open and close said door, said door drive mechanism comprising a drive member and a driven member for engaging the door, the drive and the driven members being mutually positioned and configured such that they are not engaged when the door is at or close to a closed position, and outward movement of the drive member causes full engagement with the driven member to open the door, and wherein the drive member comprises a rotating drive arm and the driven member comprises a rotating driven arm, and said arms are mutually located and configured such that initial rotation of the drive arm brings it into engagement with the driven arm, and further rotation in the same direction causes full engagement and force on the driven arm for opening of the door connected to the driven member, and wherein the drive arm and the driven arm are mutually positioned and configured such that when a door-closed position approaches with a small angle $\alpha$ remaining to a fully closed position the drive arm disengages from the driven arm, and wherein the driven arm is linked by a pivot joint to a link arm which is in turn linked by a pivot joint to a bracket for fixing to the door, and wherein the door arm comprises a roller/pin/spigot at or near an extremity of the drive arm, for engagement in the slot of the driven arm.

20. A drive apparatus for a furniture unit, the apparatus comprising:

a controller with a user interface, a frame for securing to a wall, a push-pull drive mechanism to push the unit outwardly from a home position to a top extended position, and a vertical drive mechanism to lower the unit from said top extended position to a level at which it is more accessible, and to subsequently lift the unit upwardly back to the top extended position, and in which the push-pull drive mechanism is adapted to retract the unit from said top extended position to the home position under control of the controller, the push/pull drive mechanism including a chain for engaging a furniture unit and a sprocket to rotate to push the chain outwardly and pull the chain inwardly, and wherein the push-pull mechanism is mounted in fixed relationship on the apparatus frame with the chain being operable to extend and retract relative to the frame to push a furniture unit out and pull it back.

21. The apparatus as claimed in claim 20, wherein the apparatus comprises a slidable frame for supporting a furniture unit, and said frame is slidably mounted to the apparatus frame for movement between the extended top and home positions, and wherein the vertical drive mechanism is mounted to said slidable frame, and is arranged to move a furniture unit vertically relative to the slidable frame.

22. A cabinet comprising a storage unit and a drive apparatus arranged to move the storage unit to and from a home position within the cabinet, wherein the drive apparatus comprises comprising:

a controller with a user interface, a frame for securing to a wall, a push-pull drive mechanism to push the storage unit outwardly from a home position to a top extended position, and a vertical drive mechanism to lower the storage unit from said top extended position to a level at which it is more accessible, and to subsequently lift the unit upwardly back to the top extended position, and in which the push-pull drive mechanism is adapted to retract the storage unit from said top extended position to the home position under control of the controller, the push/pull drive mechanism including a chain for engaging a furniture unit and a sprocket to rotate to push the chain outwardly and pull the chain inwardly, and wherein the push-pull mechanism is mounted in fixed relationship on the apparatus frame with the chain being operable to extend and retract relative to the frame to push a furniture unit out and pull it back, and wherein the apparatus includes a slidable frame for supporting a furniture unit, and said frame is slidably mounted to the apparatus frame for movement between the extended top and home positions, and wherein the vertical drive mechanism is mounted to said slidable frame, and is arranged to move a furniture unit vertically relative to the slidable frame.

* * * * *